United States Patent
Okamura et al.

(10) Patent No.: US 12,410,103 B2
(45) Date of Patent: Sep. 9, 2025

(54) CUBIC BORON NITRIDE SINTERED MATERIAL AND CUTTING TOOL

(71) Applicants: SUMITOMO ELECTRIC INDUSTRIES, LTD., Osaka (JP); SUMITOMO ELECTRIC HARDMETAL CORP., Hyogo (JP)

(72) Inventors: Katsumi Okamura, Osaka (JP); Mayu Amemiya, Osaka (JP); Akito Ishii, Osaka (JP); Yuka Deguchi, Osaka (JP); Satoru Kukino, Hyogo (JP)

(73) Assignees: Sumitomo Electric Industries, Ltd., Osaka (JP); SUMITOMO ELECTRIC HARDMETAL CORP., Hyogo (JP)

( * ) Notice: Subject to any disclaimer, the term of this patent is extended or adjusted under 35 U.S.C. 154(b) by 795 days.

(21) Appl. No.: 17/625,363

(22) PCT Filed: Jul. 17, 2020

(86) PCT No.: PCT/JP2020/027899
§ 371 (c)(1),
(2) Date: Jan. 7, 2022

(87) PCT Pub. No.: WO2021/010472
PCT Pub. Date: Jan. 21, 2021

(65) Prior Publication Data
US 2022/0250990 A1    Aug. 11, 2022

(30) Foreign Application Priority Data
Jul. 18, 2019    (JP) ................. 2019-133023

(51) Int. Cl.
B23B 27/20    (2006.01)
C04B 35/56    (2006.01)
(Continued)

(52) U.S. Cl.
CPC .......... *C04B 35/5831* (2013.01); *B23B 27/20* (2013.01); *C04B 35/5618* (2013.01);
(Continued)

(58) Field of Classification Search
CPC ............ C04B 35/5831; C04B 35/5618; C04B 41/87; C04B 35/622; C04B 41/5025;
(Continued)

(56) References Cited

U.S. PATENT DOCUMENTS 5,853,873 A * 12/1998 Kukino .................. C04B 41/87
428/408
2009/0120011 A1    5/2009 Okamura et al.
(Continued)

FOREIGN PATENT DOCUMENTS

| CN | 101218189 A | 7/2008 |
| CN | 101466651 A | 6/2009 |

(Continued)

OTHER PUBLICATIONS

JP-61141672-A, machine translation (Year: 1986).*
JP61141672 A Tajima STIC partial human translation (Year: 1986).*

*Primary Examiner* — Amber R Orlando
*Assistant Examiner* — Marites A Guino-O Uzzle
(74) *Attorney, Agent, or Firm* — Renner, Otto, Boisselle & Sklar, LLP

(57) ABSTRACT

A cubic boron nitride sintered material comprises cubic boron nitride particles, a binding phase, and an interfacial phase. The interfacial phase intervenes between the cubic boron nitride particles and the binding phase. The interfacial phase includes aluminum, nitrogen, boron, and oxygen. A total of an average value of the atomic concentrations of aluminum included in the interfacial phase and an average value of the atomic concentrations of nitrogen included in the interfacial phase is 50.0 at % or more. A ratio of an (Continued)

average value of the atomic concentrations of nitrogen included in the interfacial phase to an average value of the atomic concentrations of boron included in the interfacial phase is more than 1.00.

9 Claims, 14 Drawing Sheets

(51) Int. Cl.
    *C04B 35/5831*     (2006.01)
    *C04B 41/87*     (2006.01)
    *B22F 5/00*     (2006.01)
    *B23B 27/14*     (2006.01)
    *C04B 35/622*     (2006.01)
    *C04B 41/50*     (2006.01)
    *C22C 26/00*     (2006.01)

(52) U.S. Cl.
    CPC ........ *C04B 41/87* (2013.01); *B22F 2005/001* (2013.01); *B23B 27/14* (2013.01); *C04B 35/622* (2013.01); *C04B 41/5025* (2013.01); *C04B 2235/3217* (2013.01); *C04B 2235/3232* (2013.01); *C04B 2235/3409* (2013.01); *C04B 2235/3843* (2013.01); *C04B 2235/3856* (2013.01); *C04B 2235/386* (2013.01); *C04B 2235/3865* (2013.01); *C04B 2235/3886* (2013.01); *C04B 2235/762* (2013.01); *C04B 2235/85* (2013.01); *C22C 2026/003* (2013.01)

(58) Field of Classification Search
    CPC .... C04B 2235/3217; C04B 2235/3232; C04B 2235/3409; C04B 2235/3843; C04B 2235/3856; C04B 2235/386; C04B 2235/3865; C04B 2235/3886; C04B 2235/762; C04B 2235/85; C04B 35/6268; C04B 2235/3869; C04B 2235/3882; C04B 2235/48; C04B 2235/5436; C04B 2235/5445; C04B 2235/6567; C04B 35/628; C04B 35/62889; C04B 35/62615; C04B 35/62886; C04B 35/638; C04B 35/645; C04B 41/009; C04B 2235/3817; C04B 35/6303; C04B 41/81; C04B 35/56; B23B 27/20; B23B 27/14; B23B 27/16; B22F 2005/001; C22C 2026/003

See application file for complete search history.

(56) References Cited

U.S. PATENT DOCUMENTS

| | | |
|---|---|---|
| 2009/0169840 A1 | 7/2009 | Okamura et al. |
| 2015/0132076 A1* | 5/2015 | Miyashita ......... C04B 35/62889 |
| | | 264/681 |
| 2017/0197886 A1* | 7/2017 | Danda ................ C04B 35/6303 |

FOREIGN PATENT DOCUMENTS

| | | |
|---|---|---|
| EP | 2851148 A1 | 3/2015 |
| EP | 3061738 A1 | 8/2016 |
| EP | 3578534 A1 | 12/2019 |
| JP | 61141672 A * | 6/1986 |
| JP | S61-197469 A | 9/1986 |
| JP | 2006-169080 A | 6/2006 |
| JP | 2007-70148 A | 3/2007 |
| JP | 2009-513471 A | 4/2009 |
| JP | 2013-234237 A | 11/2013 |
| JP | 2015-044259 A | 3/2015 |
| JP | 2019-65513 A | 4/2019 |
| WO | 2007/049140 A2 | 5/2007 |
| WO | 2019/087481 A1 | 5/2019 |

* cited by examiner

FIG.14
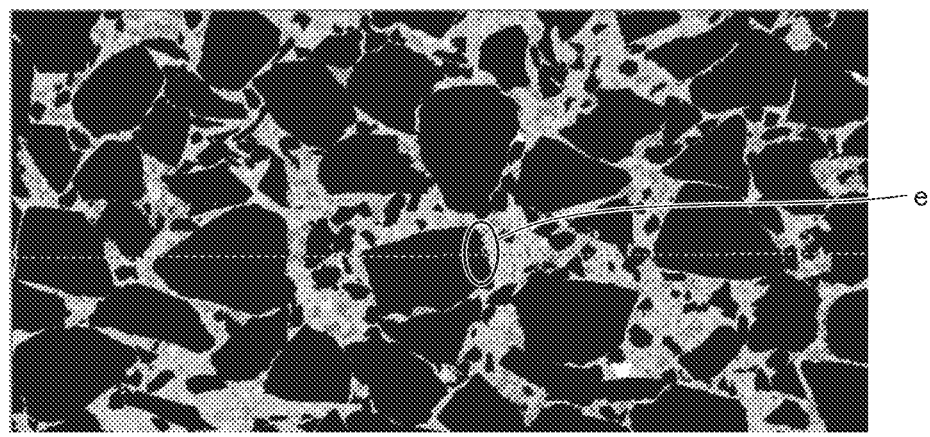
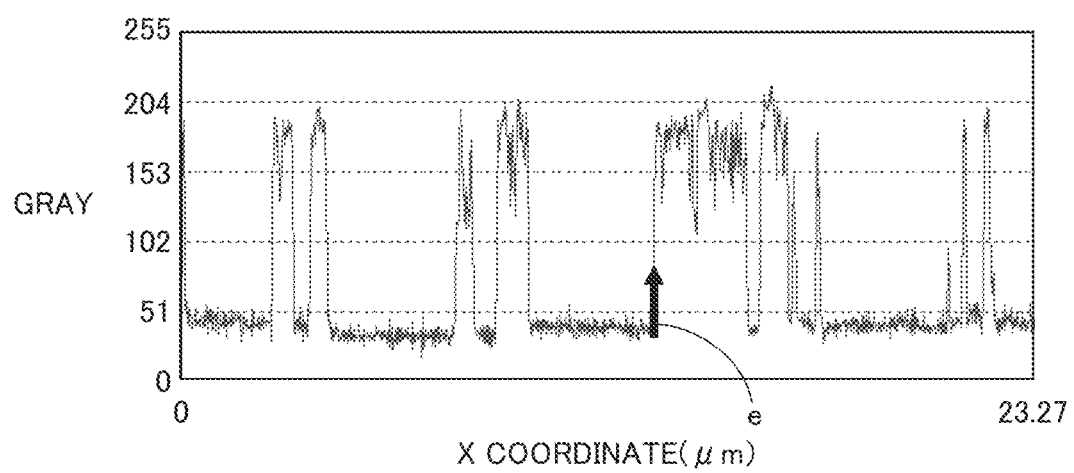

CUBIC BORON NITRIDE SINTERED MATERIAL AND CUTTING TOOL

TECHNICAL FIELD

The present disclosure relates to a cubic boron nitride sintered material and a cutting tool. The present application claims a priority based on Japanese Patent Application No. 2019-133023 filed on Jul. 18, 2019. The entire contents disclosed therein are deemed to be incorporated by reference into the present description.

BACKGROUND ART

Japanese Patent Laying-Open No. 2015-044259 (PTL 1) discloses a cubic boron nitride sintered material.

CITATION LIST

Patent Literature

PTL 1: Japanese Patent Laying-Open No. 2015-044259

SUMMARY OF INVENTION

The cubic boron nitride sintered material of the present disclosure comprises cubic boron nitride particles, a binding phase, and an interfacial phase.

The cubic boron nitride particles account for 20 vol % or more and 80 vol % or less in the cubic boron nitride sintered material. The total of the volume percentages of the binding phrase and the interfacial phase is, when the volume percentage of the cubic boron nitride sintered material is 100 vol %, a numerical value obtained by subtracting a volume percentage of the cubic boron nitride particles from the 100 vol %.

The binding phase includes one or more components selected from the group consisting of compounds and solid solutions.

Each of the compounds and the solid solutions includes a first element and a second element. The first element is one or more selected from the group consisting of nitrogen, carbon, boron, and oxygen. The second element is one or more selected from the group consisting of Group 4 elements, Group 5 elements, Group 6 elements, and aluminum in the periodic table.

The interfacial phase intervenes between the cubic boron nitride particles and the binding phase. The interfacial phase includes aluminum, nitrogen, boron, and oxygen. The total of an average value of the atomic concentrations of aluminum included in the interfacial phase and an average value of the atomic concentrations of nitrogen included in the interfacial phase is 50.0 at % or more. A ratio of an average value of the atomic concentrations of nitrogen included in the interfacial phase to an average value of the atomic concentrations of boron included in the interfacial phase is more than 1.00.

BRIEF DESCRIPTION OF DRAWINGS

FIG. 14 is a figure for describing the interface between black regions and the binding phase.

DETAILED DESCRIPTION

Figure 1:
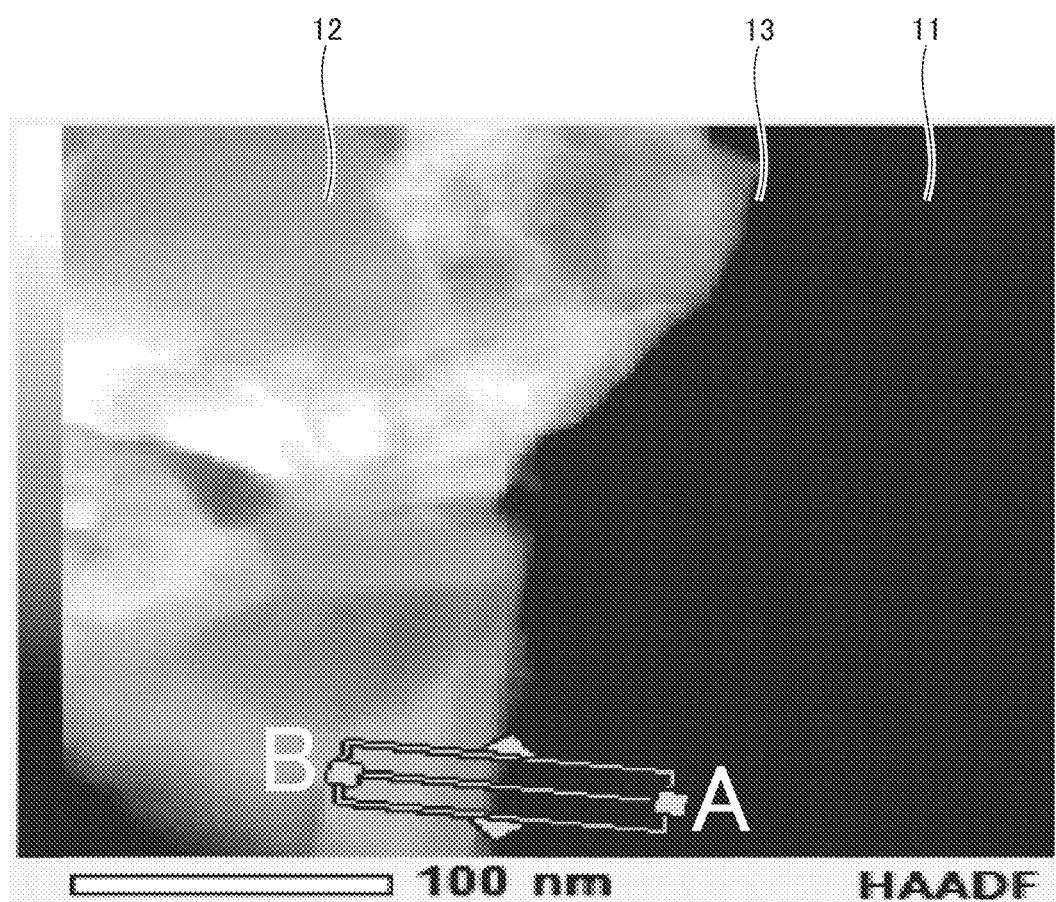
FIG. 1 is an example of a cross-section image of a cBN sintered material of the present embodiment.

[Problem to be Solved by the Present Disclosure]

A cubic boron nitride (cBN) sintered material is used for a cutting tool. In the present description, a cutting tool including the cBN sintered material is also written as the "cBN tool." The cBN sintered material includes cBN particles and a binding phase. The cBN particles form the skeleton of the cBN sintered material. The binding phase includes a ceramic material. The ceramic material includes, for example, titanium nitride (TiN).

The cBN tool is used for cutting work of a hardened steel. A hardened steel is used for, for example, automobile parts (gear, shaft, and bearing). In the cutting work of a hardened steel, the life of the cBN tool tends to be not stable. Of the hardened steels, a cutting work of a high-strength hardened steel is likely to have a particularly short life of the cBN tool.

A high-strength hardened steel is formed of hard particles dispersed inside the hardened steel. During a cutting work for a high-strength hardened steel, the surface of the cBN tool is abraded by hard particles included in the high-strength hardened steel. Due to this, cBN particles may fall off cBN particles form the skeleton of the cBN sintered material. When a part of the skeleton falls off, a sudden defect of the cBN sintered material may occur. Additionally, when a part of the skeleton falls off, the wear at the flank may rapidly progress. As a result, cutting resistance rapidly increases likely causing a defect. Conventionally, from a viewpoint of the life of the cBN tool, the cBN tool is often used at a cutting speed of, for example, 150 m/min or less during a cutting work of a high-strength hardened steel.

An object of the present disclosure is to enhance the life of the cBN tool.

DESCRIPTION OF EMBODIMENTS

First of all, the embodiments of the present disclosure are listed. The summery of the embodiments of the present disclosure is described herein.

(1) A cubic boron nitride sintered material comprises cubic boron nitride particles, a binding phase, and an interfacial phase.

The cubic boron nitride particles account for 20 vol % or more and 80 vol % or less in the cubic boron nitride sintered material. The total of the volume percentages of the binding phrase and the interfacial phase is, when the volume percentage of the cubic boron nitride sintered material is 100 vol %, a numerical value obtained by subtracting a volume percentage of the cubic boron nitride particles from the 100 vol %.

The binding phase includes one or more components selected from the group consisting of compounds and solid solutions.

Each of the compounds and the solid solutions includes a first element and a second element. The first element is one or more selected from the group consisting of nitrogen, carbon, boron, and oxygen. The second element is one or more selected from the group consisting of Group 4 elements, Group 5 elements, Group 6 elements, and aluminum in the periodic table.

The interfacial phase intervenes between the cubic boron nitride particles and the binding phase. The interfacial phase includes aluminum, nitrogen, boron, and oxygen. The total of an average value of the atomic concentrations of aluminum included in the interfacial phase and an average value of the atomic concentrations of nitrogen included in the interfacial phase is 50.0 at % or more. The ratio of an average value of the atomic concentrations of nitrogen included in the interfacial phase to an average value of the atomic concentrations of boron included in the interfacial phase is more than 1.00.

During a cutting work of a high-strength hardened steel, cracks occur and further spread inside the cBN sintered material, thereby presumably causing defects.

According to the new findings of the present disclosure, cracks selectively run through the interface between cBN particles and the binding phase. At the interface between cBN particles and the binding phase, brittle substances are scattered. Brittle substances are presumed to be possibly crack origins or crack spreading paths. Brittle substances may be, for example, $TiB_2$, $AlB_2$, and $Al_2O_3$. Brittle substances are presumed to be derived from cBN particles and the binding material (precursor of the binding phase).

In the cBN sintered material of the present disclosure, the interfacial phase, in place of the above brittle substances, intervenes between the cBN particles and the binding phase. The interfacial phase has a specific composition. That is, the interfacial phase includes aluminum (Al), nitrogen (N), boron (B), and oxygen (O).

The main components of the interfacial phase are Al and N. That is, the total of an average value of the atomic concentrations of Al included in the interfacial phase and an average value of the atomic concentrations of N included in the interfacial phase is 50.0 at % or more. Hereinafter, in the present description, this total is also written as the "total concentration $_{(Al+N)}$."

As the main components of the interfacial phase are Al and N, the interfacial phase may have the metallic ductility. The interfacial phase, due to the metallic ductility, may absorb an external stress. Crack occurrence and crack spread are presumed to be prevented when a stress is absorbed by the interfacial phase.

Further, the ratio of an average value of the atomic concentrations of N included in the interfacial phase to an average value of the atomic concentrations of B included in the interfacial phase is more than 1.00. Hereinafter, this ratio is also written as the "concentration ratio (NB)." In the interfacial phase, when an atomic concentration of N is higher than an atomic concentration of B, the adhesion of cBN particles and the binding phase may be enhanced. This may prevent cBN particles from falling off.

The synergy of the stress absorption effect by the interfacial phase and the adhesion enhancement effect by the interfacial phase may enhance the defect resistance of the cBN sintered material. As a results, the life of the cBN tool may be enhanced.

(2) The interfacial phase may further include carbon. When a line analysis of an atomic concentration is performed in a thickness direction of the interfacial phase, the atomic concentration of aluminum has a single maximum value. The ratio of an average value of the atomic concentrations of carbon to an average value of the atomic concentrations of aluminum may be 0.01 or more and 0.30 or less.

Hereinafter, in the present description, the ratio of an average value of the atomic concentrations of carbon (C) to an average value of the atomic concentrations of Al is also written as the "concentration ratio $_{(C/Al)}$."

The interfacial phase of the present disclosure includes components derived from a binding material. Of the components derived from the binding material, metal elements other than Al (for example, Ti and W) tend to have low adhesion to cBN particles. Thus, when metal elements other than Al of the components derived from the binding material are diffused in the interfacial phase, the adhesion of cBN particles and the binding phase is likely to be reduced.

Metal elements other than Al may be prevented from diffusing in the interfacial phase by the inclusion of carbon in a specific amount to Al in the interfacial phase. This may enhance the adhesion of cBN particles and the binding phase.

(3) The cubic boron nitride particles may account for 35 vol % or more and less than 75 vol % in the cubic boron nitride sintered material.

The higher the volume percentage of cBN particles, the defect resistance tends to be enhanced. On the other hand, the higher the volume percentage of cBN particles, the wear resistance also tends to be reduced. When the volume percentage of cBN particles is 35 vol % or more and less than 75 vol %, the contact probability of cBN particles inside the cBN sintered material may be moderate. As a result, the defect resistance and the wear resistance of the cBN sintered material may be enhanced.

(4) The binding phase may also include titanium. The binding phase may further include one or more selected from the group consisting of zirconium, niobium, molybdenum, hafnium, tantalum, and tungsten.

When the binding phase includes titanium (Ti), and further includes niobium (Nb) and the like, the strength of the binding phase and the toughness of the binding phase may be enhanced. It is presumed that Nb and the like induce solid solution strengthening. When the binding phase has high strength and high toughness, the wear resistance and the defect resistance of the cBN sintered material may be enhanced.

(5) An average value of the thicknesses of the interfacial phase may be 5 nm or more and 100 nm or less.

When an average value of the thicknesses of the interfacial phase is 5 nm or more and 100 nm or less, the life of the cBN tool may be enhanced.

(6) An average value of the thicknesses of the interfacial phase is 5 nm or more and 20 nm or less.

When an average value of the thicknesses of the interfacial phase is 5 nm or more and 20 nm or less, the life of the cBN tool may be much enhanced.

(7) Oxygen may be dissolved in the components included in the binding phase.

An oxide layer is formed on the surface of cBN particles. The oxide layer has a thickness of several nm. The oxide layer is presumed to include $B_2O_3$ and the like. Conventionally, nitrides such as TiN and TiCN are used for the binding material. It is presumed that the reaction of the oxide layer ($B_2O_3$) and the binding material (TiN, TiCN and the like) during sintering produces brittle substances ($TiB_2$ and the like) at the interface between cBN particles and the binding material.

In the novel process of the present disclosure, for example, the above interfacial phase is formed in place of brittle substances. In one of the new processes of the present disclosure, an oxide may be used as a raw material of the binding material. It is presumed that the use of an oxide as a raw material of the binding material (precursor of the binding phase) causes a state in which a small amount of oxygen is dissolved in the binding phase of the final product.

Conventionally, for example, when a raw material powder of a cBN sintered material is crashed, the surface of the particles is oxidized and thereby oxygen was sometimes introduced to the cBN sintered material. However, the oxygen introduced in this way had a possibility of detrimentally affecting the sinterability and the binding force. On the other hand, the oxygen dissolved in the binding phase by the new process of the present disclosure may be expected to cause the solid solution strengthening of the binding phase.

(8) The cutting tool of the present disclosure comprises the cubic boron nitride sintered material according to any one of the above (1) to (7). The cutting tool of the present disclosure, that is, the cBN tool, may have the long life, for example, in the work of a high-strength hardened steel.

(9) The cutting tool according to the above (8) may be a coated cutting tool. The coated cutting tool includes a covering film. The covering film covers at least a part of the surface of the cubic boron nitride sintered material.

Advantageous Effect of the Present Disclosure

According to the present disclosure, the life of the cBN tool may be enhanced.

Detailed Description of Embodiments

Hereinafter, details of the embodiments of the present disclosure (written as the "present embodiment" in the present description) will be described. However, the following descriptions do not intend to limit the claims.
<cBN Sintered Material>

FIG. 1 is an example of a cross-section image of the cBN sintered material of the present embodiment.

The cubic boron nitride (cBN) sintered material comprises cubic boron nitride (cBN) particles 11, a binding phase 12, and an interfacial phase 13. Interfacial phase 13 intervenes between cBN particles 11 and binding phase 12. The cBN sintered material may consist essentially of cBN particles 11, binding phase 12, and interfacial phase 13.
<<Interfacial Phase>>

The cross-section image of FIG. 1 is a HAADF-STEM (high-angle annular dark field scanning transmission electron microscope) image. In FIG. 1, an interface is illustrated between cBN particles 11 and binding phase 12. In the present embodiment, interfacial phase 13 is specified by the following procedure.

For example, a cross-section sample is collected from the cBN sintered material by an FIB (focused ion beam) device. The cross-section sample is observed using STEM. The observation magnification is, for example, about 500000 times. HAADF images are taken at 5 randomly extracted places, respectively. Further, element mappings are carried out at the same 5 places respectively by EDX (energy dispersive x-ray spectroscopy) that comes with STEM. The image-taking place mentioned herein is 5 places, but the 5 places are only an example. The number of image-taking place may be enough numbers that may obtain of an average structural information. The number of image-taking places that is too small is likely to fail to obtain an average structural information when an unusual place is included in the randomly extracted places.

Figure 2:
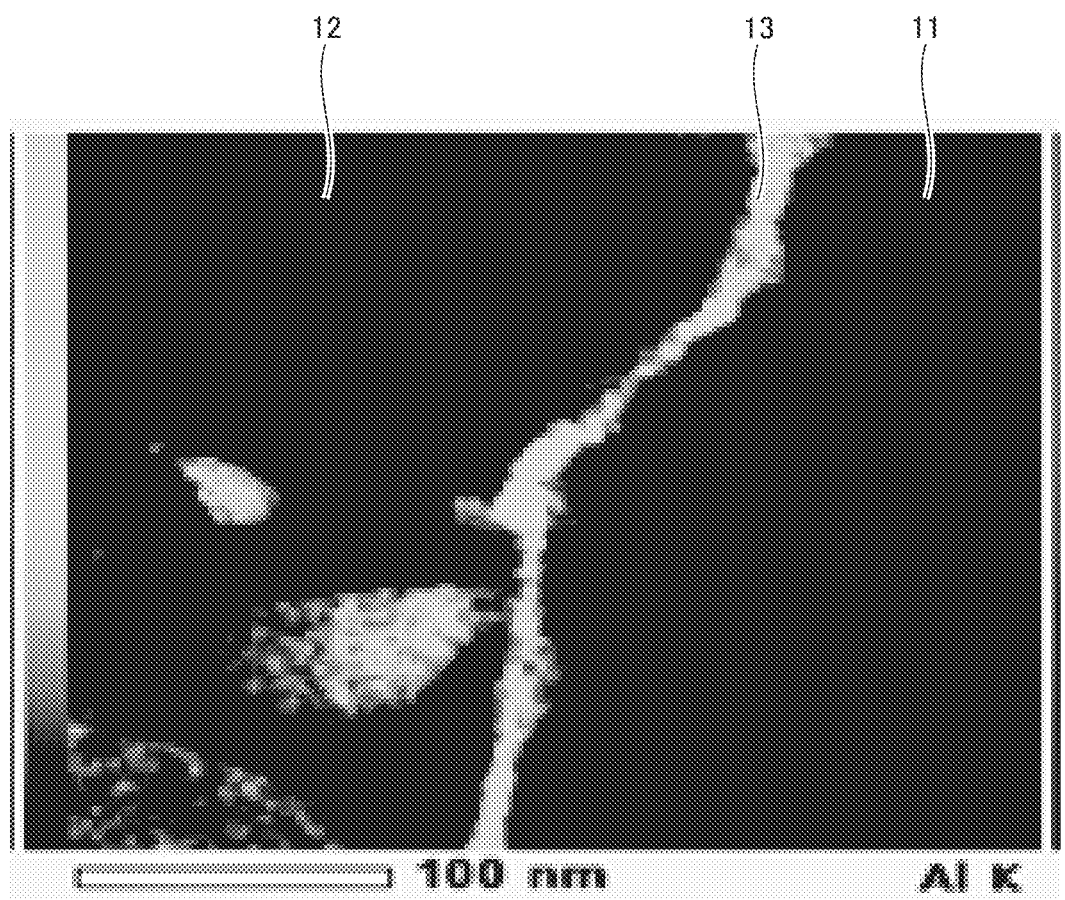
FIG. 2 is a mapping result of Al of the image in FIG. 1.

FIG. 2 is a mapping result of Al of the image in FIG. 1.

Al is homogeneously distributed at the interface between cBN particles 11 and binding phase 12.

Further, an EDX line analysis is carried out in a direction substantially orthogonal to the direction in which the interface between cBN particles 11 and binding phase 12 extends. That is, a simultaneous multielement analysis is carried out on a straight line (A-B) connecting Point A and Point B of FIG. 1. The length of the straight line is 0.1004 μm. On the straight line (A-B), the interval between the adjacent measurement points is 0.0024 The number of measurement points is 43 points. The direction substantially orthogonal to the direction in which the interface between cBN particles 11 and binding phase 12 extends is equivalent to the thickness direction of interfacial phase 13.

Figure 3:
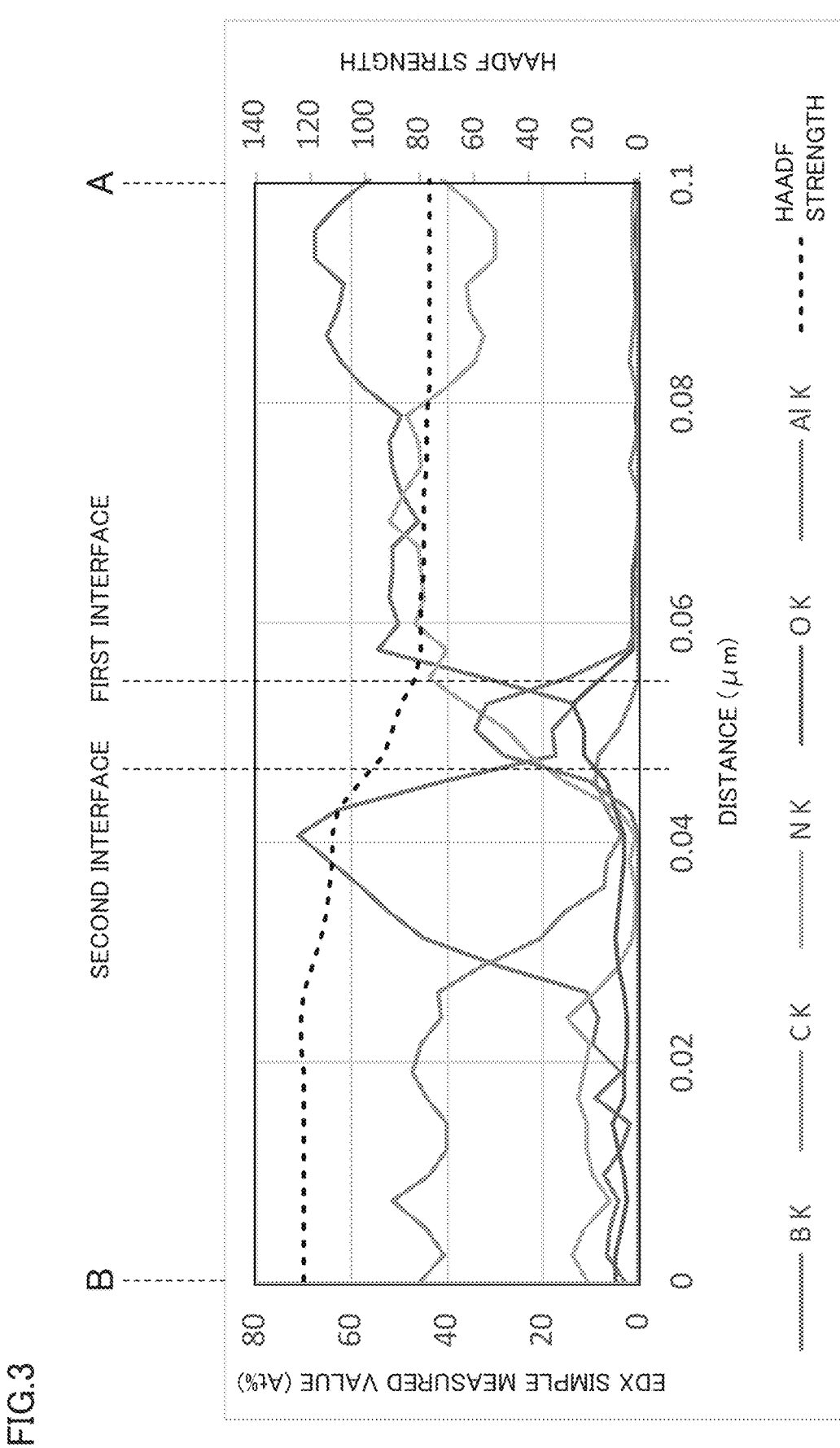
FIG. 3 is a graph showing the result of a line analysis.

FIG. 3 is a graph showing the result of a line analysis.

Interfacial phase 13 of the present embodiment presumably consists of non-stoichiometric compounds. Interfacial phase 13 includes Al, N, B, and O. Interfacial phase 13 may consist essentially of Al, N, B, and O. Interfacial phase 13 may further include, for example, C.

Figure 4:
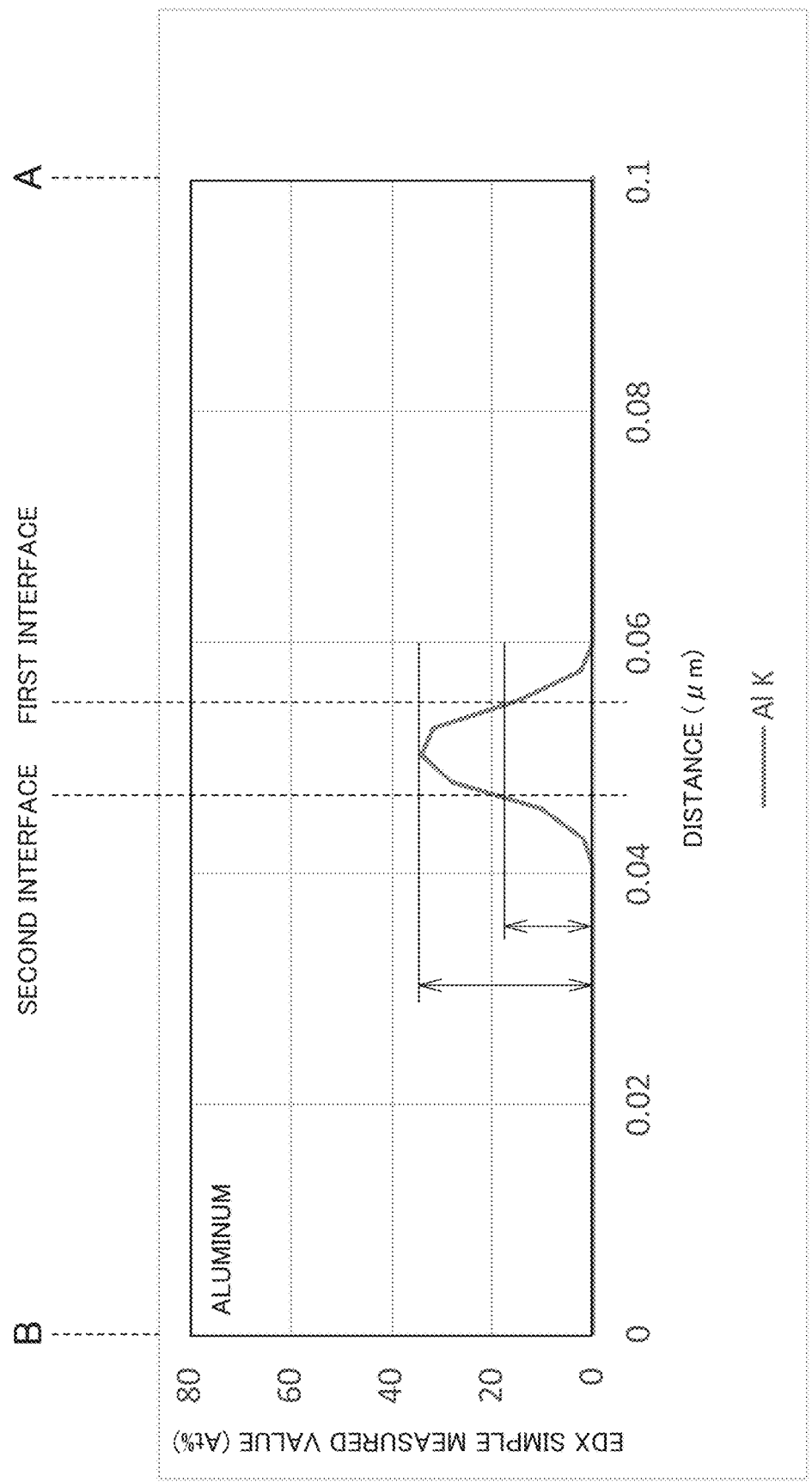
FIG. 4 is a graph showing an atomic concentration distribution of Al of FIG. 3.

FIG. 4 is a graph showing an atomic concentration distribution of Al of FIG. 3.

Figure 5:
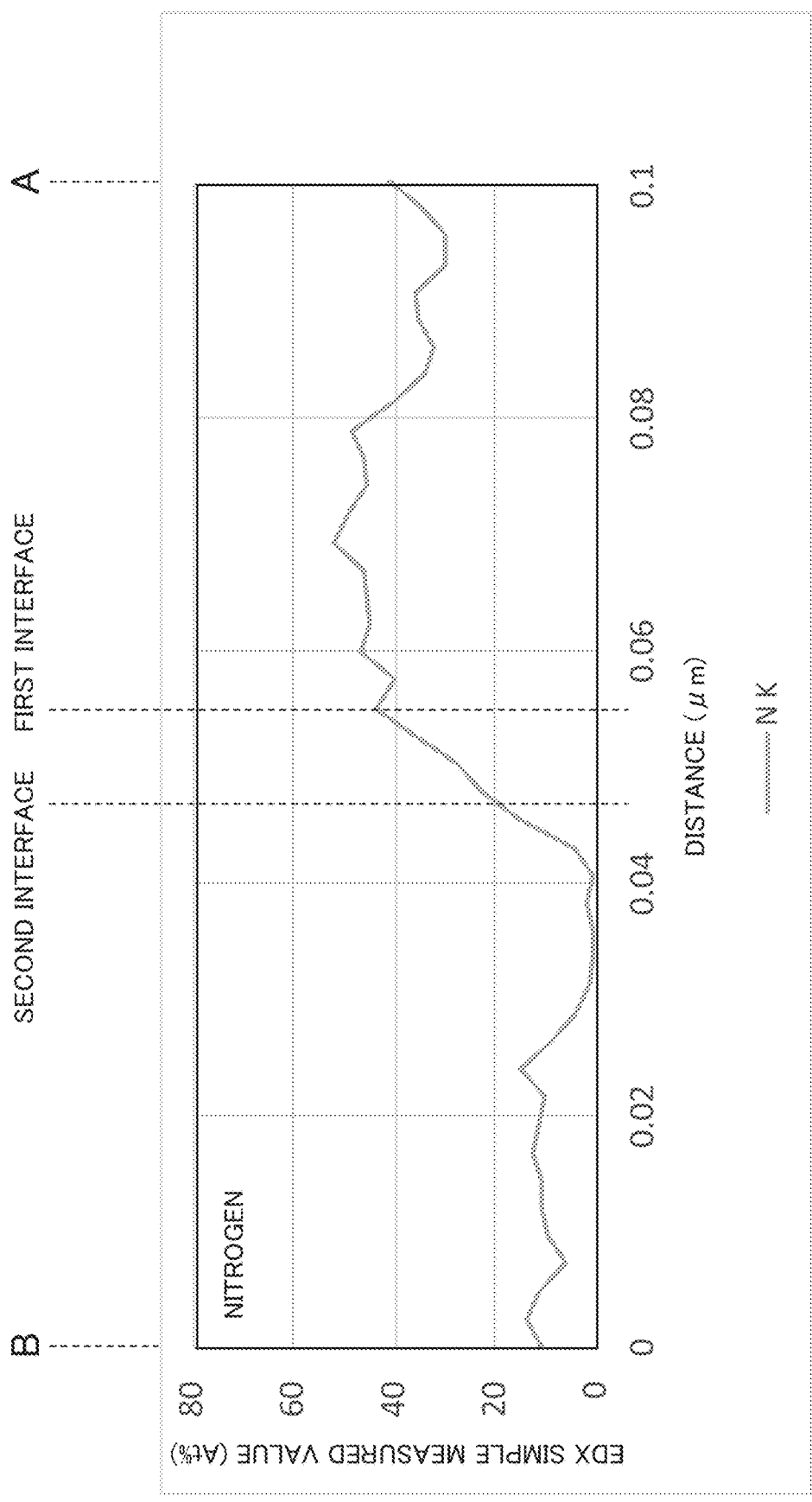
FIG. 5 is a graph showing an atomic concentration distribution of N of FIG. 3.

FIG. 5 is a graph showing an atomic concentration distribution of N of FIG. 3.

Figure 6:
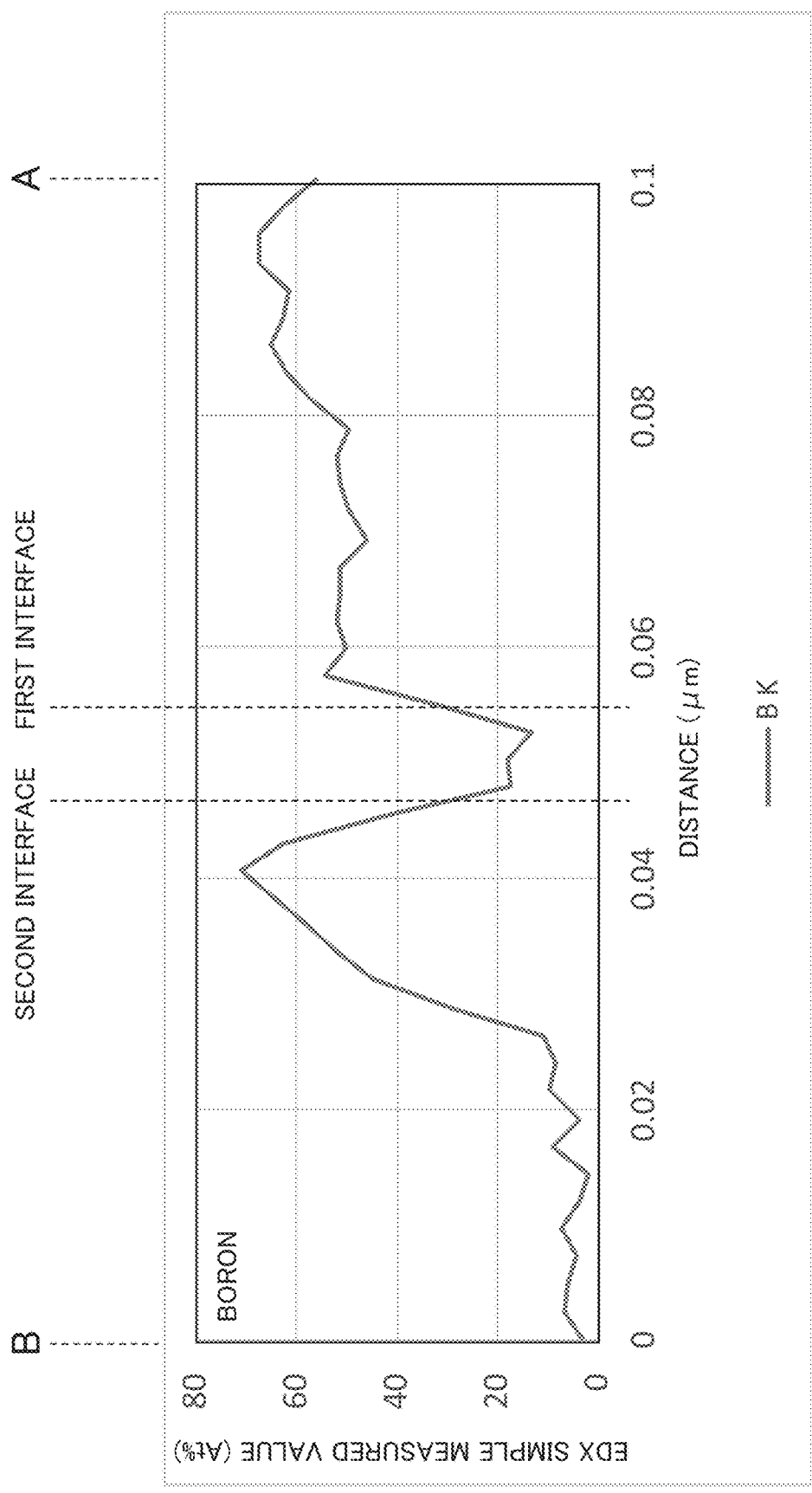
FIG. 6 is a graph showing an atomic concentration distribution of B FIG. 3.

FIG. 6 is a graph showing an atomic concentration distribution of B of FIG. 3.

Figure 7:
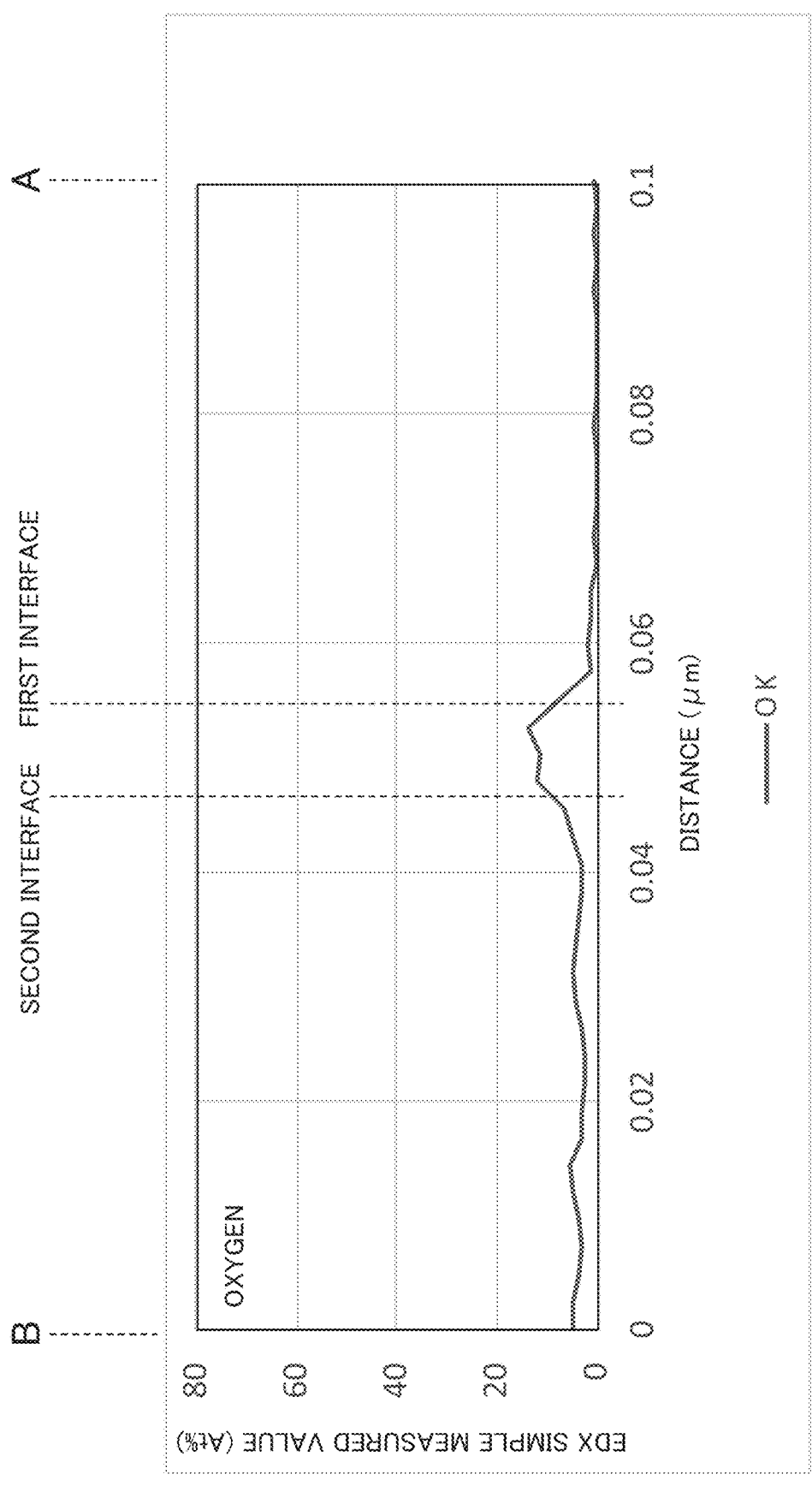
FIG. 7 is a graph showing an atomic concentration distribution of O of FIG. 3.

FIG. 7 is a graph showing an atomic concentration distribution of O of FIG. 3.

Figure 8:
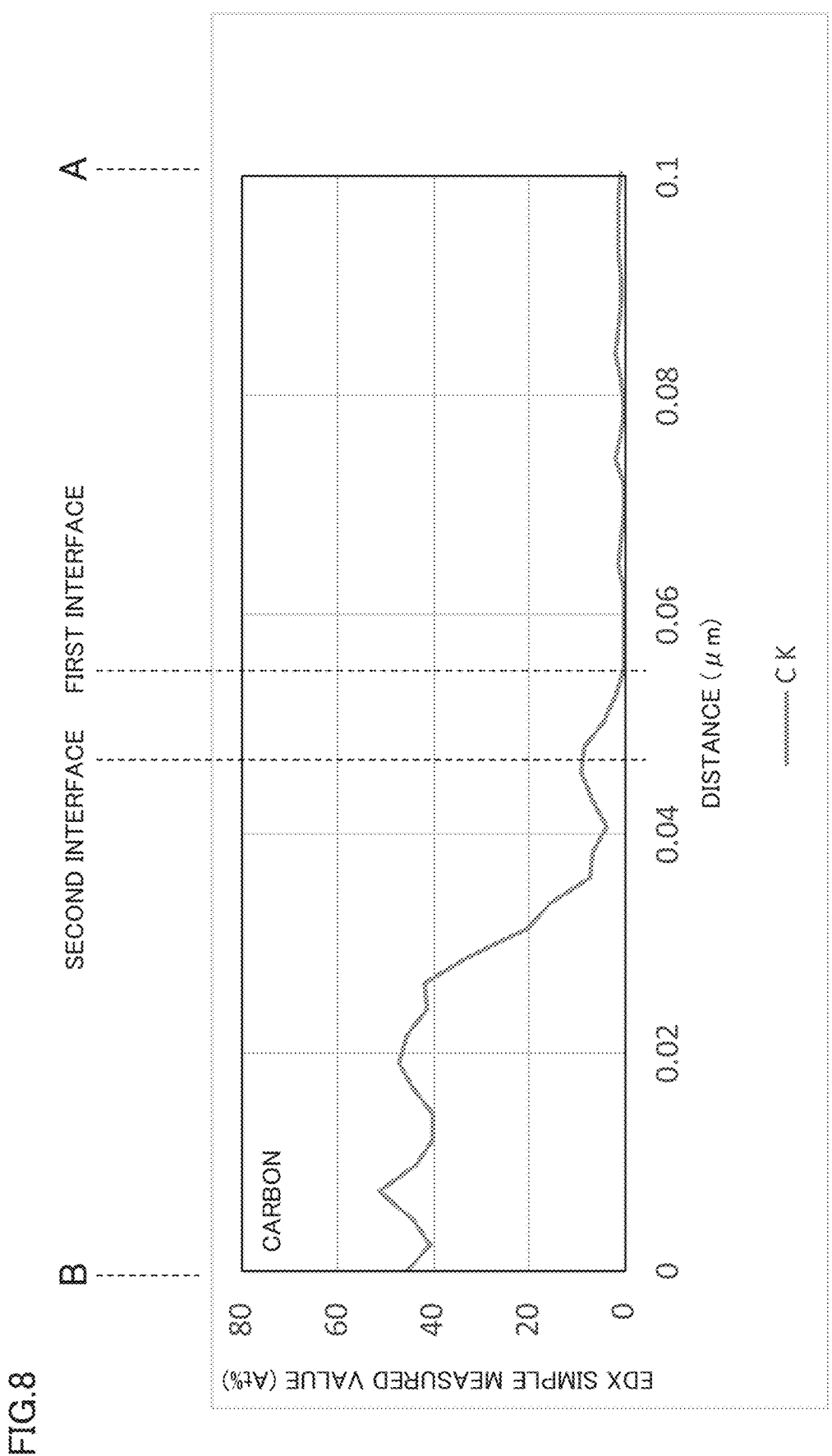
FIG. 8 is a graph showing an atomic concentration distribution of C of FIG. 3.

FIG. 8 is a graph showing an atomic concentration distribution of C of FIG. 3.
(Specification of the Interfacial Phase)

As shown in FIG. 4, in the line analysis, the atomic concentration of Al has a single maximum value. At both sides of the position at which the atomic concentration of Al shows the maximum value, 2 positions at which the atomic concentration of Al is half a value of the maximum value are specified. Of the 2 places, the position closer to Point A is defined as the interface between cBN particles 11 and interfacial phase 13. Hereinafter, the interface between cBN particles 11 and interfacial phase 13 is also written as the "first interface." Of the 2 places, the position closer to Point B is defined as the interface between interfacial phase 13 and binding phase 12. Hereinafter, the interface between interfacial phase 13 and binding phase 12 is also written as the "second interface."

The region from the first interface to the second interface is interfacial phase 13. The measurement points included in interfacial phase 13 are specified. In the example from FIG. 1 to FIG. 8, the thickness of interfacial phase 13 is 9.6 nm. Five measurement points are included in interfacial phase 13. The number of measurement points included in interfacial phase 13 varies depending on the thickness of interfacial phase 13.

The atomic concentrations of Al at the 5 respective measurement points included in interfacial phase 13 are averaged. This provides an average value of the atomic concentrations of Al. Similarly, an average value of the atomic concentrations of N, an average value of the atomic concentrations of B, and an average value of the atomic concentrations of C are obtained, respectively. In the present description, the "average value" indicates the arithmetic average, unless otherwise specifically.

(Total Concentration $_{(Al+N)}$)

In interfacial phase 13 of the present embodiment, the total of an average value of the atomic concentrations of Al and an average value of the atomic concentrations of N (that is, "total concentration $_{(Al+N)}$") is 50.0 at % or more. That is, the main components of interfacial phase 13 are Al and N. For this reason, interfacial phase 13 is presumed to be capable of absorbing an external stress.

The total concentration $_{(Al+N)}$ in the present embodiment is valid to the first decimal place. Two or more decimal places are rounded off. The total concentration $_{(Al+N)}$ may be, for example, 50.0 at % or more and 75.2 at % or less. The total concentration $_{(Al+N)}$ may be, for example, 60.5 at % or more and 65.0 at % or less.

(Concentration Ratio $_{(N/B)}$)

In interfacial phase 13 of the present embodiment, the ratio of an average value of the atomic concentrations of N to an average value of the atomic concentrations of B (that is, "concentration ratio $_{(N/B)}$") is more than 1.00. This may enhance the adhesion of cBN particles 11 and binding phase 12.

The concentration ratio $_{(N/B)}$ in the present embodiment is valid to the second decimal place. Three or more decimal places are rounded off. The concentration ratio $_{(N/B)}$ may be, for example, 1.21 or more and 3.90 or less. The concentration ratio $_{(N/B)}$ may be, for example, 1.70 or more and 3.10 or less. The concentration ratio (N/B) may be, for example, 2.00 or more and 2.50 or less.

(Concentration Ratio $_{(C/Al)}$)

In interfacial phase 13 of the present embodiment, the ratio of an average value of the atomic concentrations of C to an average value of the atomic concentrations of Al (that is, "concentration ratio $_{(C/Al)}$") is, for example, 0.01 or more and 0.30 or less. This may prevent metal elements other than Al (for example, Ti) from diffusing from binding phase 12 to interfacial phase 13.

The concentration ratio $_{(C/Al)}$ in the present embodiment is valid to the second decimal place. Three or more decimal places are rounded off. The concentration ratio $_{(C/Al)}$ may be, for example, 0.03 or more and 0.28 or less. The concentration ratio (C/Al) may be, for example, 0.03 or more and 0.26 or less. The concentration ratio $_{(C/Al)}$ may be, for example, 0.03 or more and 0.18 or less. The concentration ratio $_{(C/Al)}$ may be, for example, 0.18 or more and 0.30 or less.

(Average Value of Thicknesses)

The thickness of interfacial phase 13 is the distance between the first interface and the second interface on the straight line (A-B). The thickness is measured at, for example, 5 places. An average of the thicknesses at 5 places is the "average value of the thicknesses." Only the integer part is valid as the average value of the thicknesses. Digits after decimal point are rounded off.

The average value of the thicknesses may be, for example, 4 nm or more and 120 nm or less. The average value of the thicknesses may be, for example, 5 nm or more and 100 nm or less. When an average value of the thicknesses of interfacial phase 13 is 5 nm or more and 100 nm or less, the life of the cBN tool may be enhanced. The average value of the thicknesses may be, for example, 5 nm or more and 50 nm or less. The average value of the thicknesses may be, for example, 5 nm or more and 20 nm or less. When an average value of the thicknesses of interfacial phase 13 is 5 nm or more and 20 nm or less, the life of the cBN tool may be much enhanced. The average value of the thicknesses may be, for example, 7 nm or more and 11 nm or less. The average value of the thicknesses may be, for example, 11 nm or more and 20 nm or less.

<<Binding Phase>>

Binding phase 12 binds cBN particles 11. In the cBN sintered material, binding phase 12 accounts for the balance, together with interfacial phase 13, of cBN particles 11. That is, the total of binding phase 12 and interfacial phase 13 accounts for the balance of cBN particles 11 in the cBN sintered material. The total of the volume percentages of binding phrase 12 and interfacial phase 13 is, when the volume percentage of the cBN sintered material is 100 vol %, a numerical value obtained by subtracting a volume percentage of cBN particles 11 from the 100 vol %. The total of binding phase 12 and interfacial phase 13 may account for, for example, 20 vol % or more and 80 vol % or less in the cBN sintered material.

Binding phase 12 includes one or more components. Binding phase 12 may consist essentially of 1 component. Binding phase 12 may also consist of 2 or more components. The components included in binding phase 12 include one or more selected from the group consisting of compounds and solid solutions. That is, binding phase 12 includes one or more components selected from the group consisting of compounds and solid solutions. Binding phase 12 may consist essentially of compounds. Binding phase 12 may also consist essentially of solid solutions. Binding phase 12 may also include both compounds and solid solutions. The composition of binding phase 12 may be specified by, for example, XRD (x-ray diffraction) and EDX.

Both compounds and solid solutions included in binding phase 12 include a first element and a second element. The compounds and the solid solutions each independently include the first element and the second element. The combination of the first element and the second element included in the compound may be same as or different from the combination of the first element and the second element included in the solid solution. The first element is a nonmetal element. The first element is one or more selected from the group consisting of nitrogen (N), carbon (C), boron (B), and oxygen (O). That is, the compound and the solid solution may be a nitride, a carbide, a boride, or an oxide. The compound and the solid solution may also be, for example, a carbide and a nitride. That is, the compound and the solid solution may be, for example, a carbonitride.

The second element is a metal element. The second element is one or more selected from the group consisting of Group 4 elements, Group 5 elements, Group 6 elements, and Al in the periodic table. Group 4 element may be one or more selected from the group consisting of, for example, titanium (Ti), zirconium (Zr), and hafnium (Hf). Group 5 element may be one or more selected from the group consisting of, for example, vanadium (V), niobium (Nb), and tantalum (Ta). Group 6 element may be one or more selected from the group consisting of, for example, chromium (Cr), molybdenum (Mo), and tungsten (W).

Binding phase 12 may include Ti. Binding phase 12 may also include, in addition to Ti, one or more selected from the group consisting of Zr, Nb, Mo, Hf, Ta, and W. This may enhance the strength of the binding phase and the toughness of the binding phase.

The binding phase may include one or more selected from the group consisting of, for example, TiCN, TiNbN, TiB$_2$, Al compounds (for example, Al$_2$O$_3$ and AlN), TiNbCN, TiZrCN, TiMoCN, TiNbZrCN, TiHfCN, TiTaCN, and TiWCN.

The composition formulae in the present description should not be limited only to the atomic ratios shown therein. The composition formula should be understood to include various conventionally known atomic ratios. The composition formula should be understood to include, for example, non-stoichiometric ratios. For example, the atomic ratio of Ti, C, and N in "TiCN" is not limited to "Ti:C:N=1: 0.5:0.5." Further, the composition formulae in the present description not only represent the composition of a compound but also represent the composition of a solid solution. The solid solution may be an interstitial solid solution or may be a substitutional solid solution.

Oxygen (O) may be dissolved in the component included in binding phase 12. The dissolved oxygen may be the oxygen derived from raw materials of the binding material (precursor of binding phase 12). The solid solution of oxygen may enhance the strength of binding phase 12 and the toughness of binding phase 12. The dissolved oxygen may be detected by, for example, EDX that comes with STEM. The dissolved oxygen may account for, for example, 1.0 at % or more and 5.0 at % or less, in binding phase 12.

<<cBN Particles>> cBN particles 11 form the skeleton of the cBN sintered material. cBN particles 11 include cBN. cBN particles 11 may include, for example, a small amount of impurities. cBN particles 11 may include a small amount of, for example, wurtzite boron nitride (wBN). cBN particles 11 may consist essentially of cBN.

cBN particles 11 account for 20 vol % or more and 80 vol % or less in the cBN sintered material. Only the integer part is valid as the volume percentage of cBN particles 11. Digits after decimal point are rounded off. The method for measuring a volume percentage will be described later. When a volume percentage of cBN particles 11 is less than 20 vol %, a sufficient life of the cBN tool cannot be expected. cBN particles 11 play a role of being the skeleton of the cBN sintered material, and it is thus presumable that the contact probability of cBN particles that is too low reduces the defect resistance. A volume percentage of cBN particles 11 of more than 80 vol % cannot be expected to impart a sufficient life to the cBN tool. This is presumably because when a contact probability of cBN particles 11 is too high, interfacial phase 13 that intervenes between cBN particles 11 and binding phase 12 relatively decreases. The volume percentage of cBN particles 11 may be, for example, 35 vol % or more and less than 75 vol %. In such a range, the contact probability of cBN particles 11 may be moderate. As a result, the effect of interfacial phase 13 that intervenes between cBN particles 11 and binding phase 12 becomes profound, and thereby the defect resistance and the wear resistance of the cBN sintered material may be enhanced. The volume percentage of cBN particles 11 may be, for example, 45 vol % or more and 70 vol % or less. The volume percentage of cBN particles 11 may be, for example, 45 vol % or more and 60 vol % or less.

cBN particles 11 may have an average particle size of, for example, 0.1 µm or more and 10 µm or less. cBN particles 11 may have an average particle size of, for example, 1 µm or more and 5 µm or less. The "particle size of cBN particles 11" refers to the equivalent circle diameter of cBN particles 11 in the cross-section image of the cBN sintered material. The "average particle size of cBN particles 11" is, for example, an arithmetic average of the particle sizes of 10 or more cBN particles 11. The 10 or more cBN particles 11 are randomly extracted from the cross-section image of the cBN sintered material.

(Method for Measuring Volume Percentage)

The volume percentage of cBN particles may be measured by SEM (scanning electron microscope). For example, the JEOL "JSM-7800F" and the like may be used. Any devices that have the equivalent functions to this device may be used.

The method for measuring the volume percentage of cBN particles is as follows.

The cBN sintered material is cut at an arbitrary position. The cross-sectional face is, for example, CP (cross section polisher) processed. A cross-sectional sample is thus prepared. The cross-sectional sample is observed by SEM in the backscattered electron mode. A backscattered electron image may be thus obtained. The observation magnification may be, for example, about 5000 times. In the backscattered electron image, regions where cBN particles are present appear as black regions, whereas regions where the binding phase is present appear as gray regions or white regions.

Then, the backscattered electron image is binarized using an image analysis software ("WinROOF" manufactured by MITANI CORPORATION). From the binarized image, an area percentage of pixels derived from the dark fields (pixels derived from cBN particles) accounting for the area of the perimetry is calculated. The calculated area percentage is regarded as the volume percentage of cBN particles.

For example, from the binarized image, a volume percentage of the binding phase may be calculated by calculating an area percentage of pixels derived from the bright fields (pixels derived from the binding phase) accounting for the area of the perimetry.

A specific binarization method is described with reference to FIG. 10 to FIG. 15.

Figure 10:
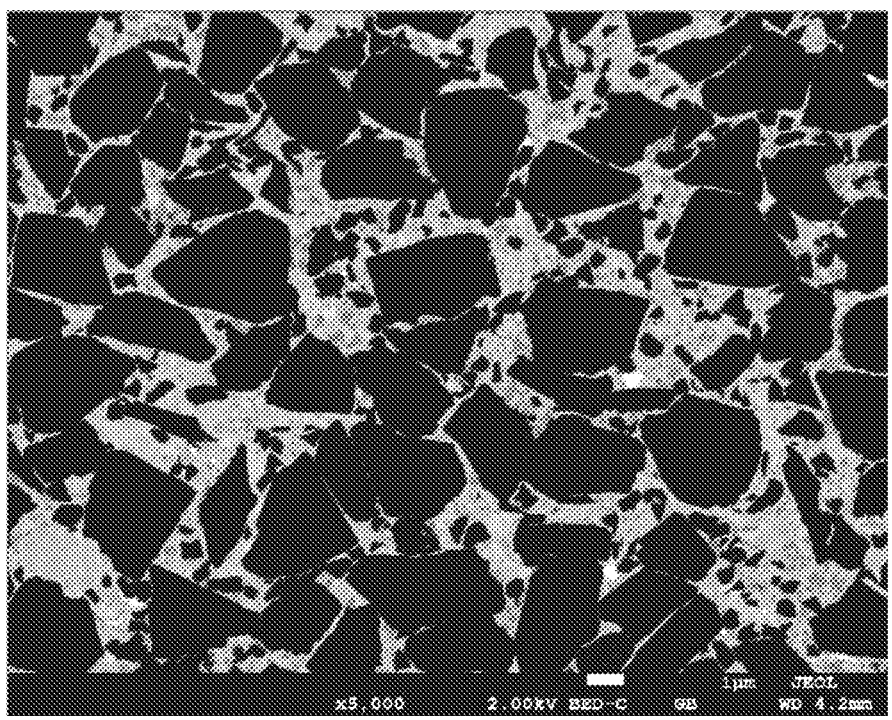
FIG. 10 is an example of a backscattered electron image of the cBN sintered material.
Figure 11:
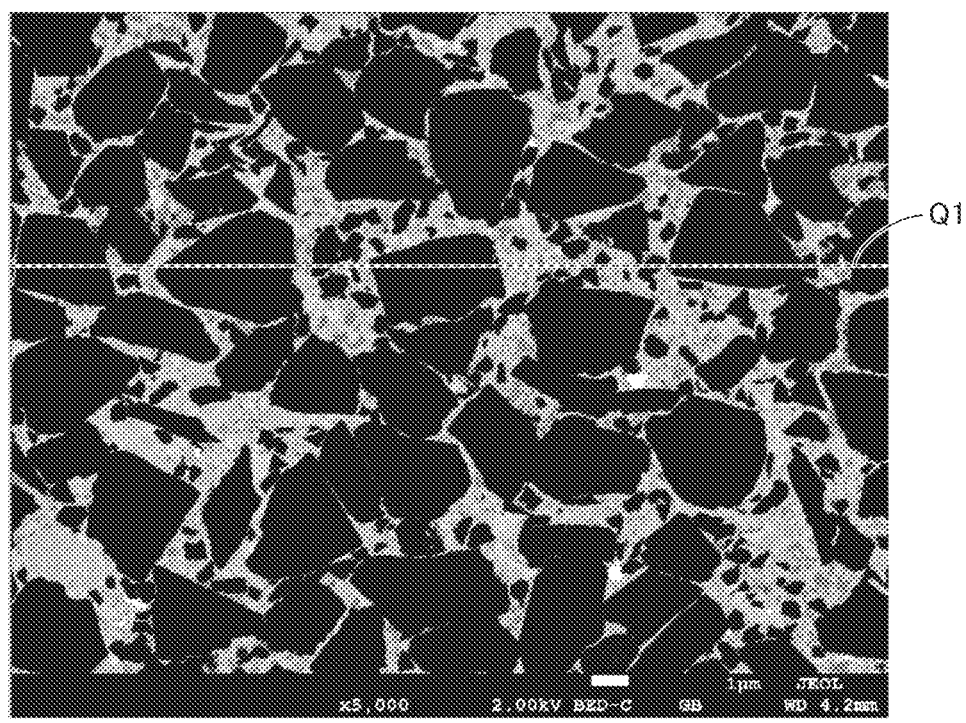
FIG. 11 is an image of the backscattered electron image of FIG. 10 read into an image processing software.

FIG. 10 is an example of a backscattered electron image of the cBN sintered material. The backscattered electron image is read into an image processing software. The image read into is shown in FIG. 11. As shown in FIG. 11, an arbitrary line Q1 is set in the image that has been read into.

Figure 12:
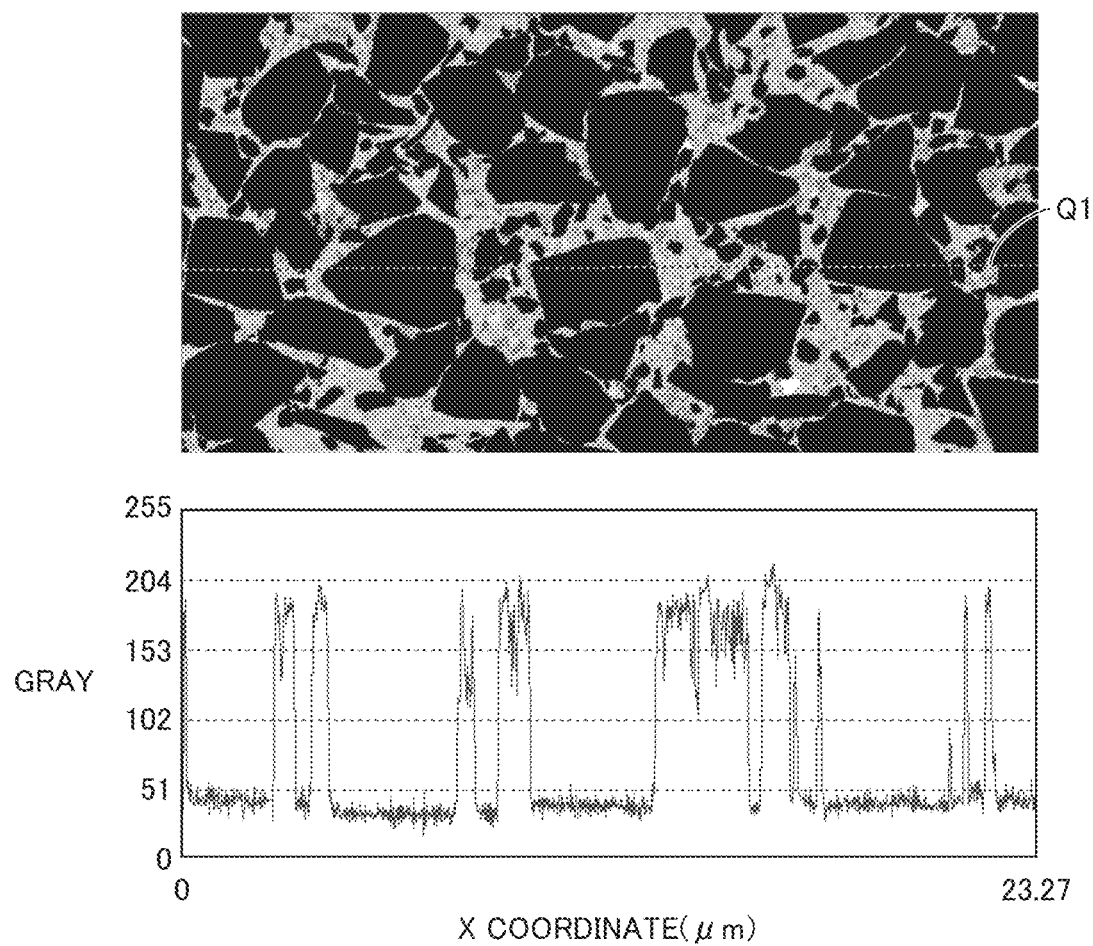
FIG. 12 is a figure describing a concentration profile graph.
Figure 13:
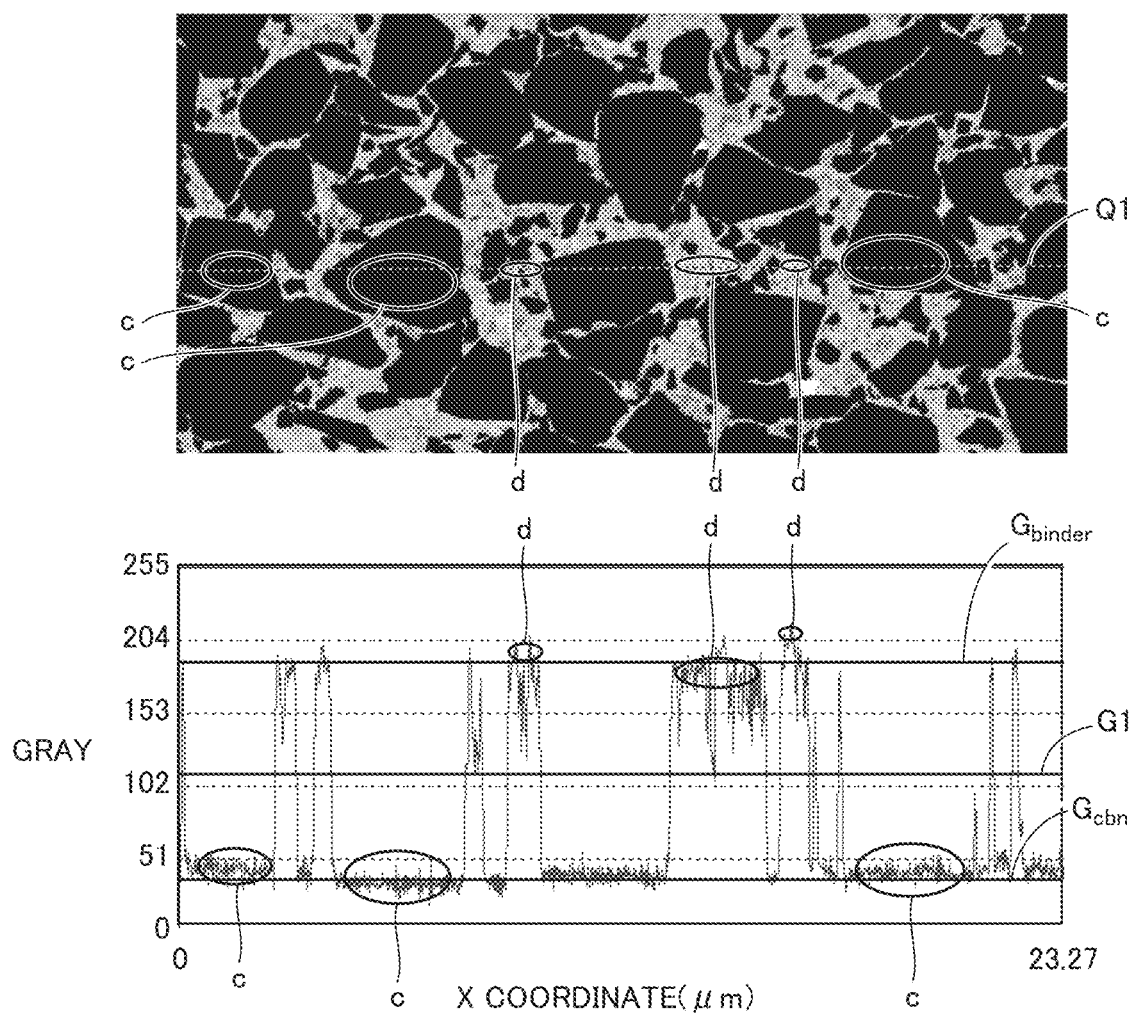
FIG. 13 is a figure for describing a method for determining black regions and the binding phase.

When a concentration is measured along with line Q1, a GRAY scale is read out. A graph is created with line Q1 as an X coordinate and the GRAY scale as a Y coordinate (hereinafter, also written as the "concentration profile graph".) FIG. 12 shows the backscattered electron image of the cBN sintered material and a concentration profile graph of the backscattered electron image. In FIG. 12, the upper image is the backscattered electron image, and the lower graph is the concentration profile graph. In FIG. 12, the width of the backscattered electron image corresponds to the width of the X coordinate (23.27 µm) in the concentration profile graph. Accordingly, the distance from the left end of line Q1 to a specific position on line Q1 in the backscattered electron image is shown in the value of the X coordinate of the concentration profile graph.

Three places are arbitrarily selected from the black regions where cBN particles are present in the backscattered electron image of FIG. 12. The black regions, for example, are the parts shown in the ovals with a sign c in the backscattered electron image of FIG. 13.

Each GRAY scale at the 3 places of the black regions is read out from the concentration profile graph. Each GRAY scale at the 3 places of the black regions is defined as the average value of GRAY scales of each of the 3 places surrounded by the ovals with a sign c in the concentration profile graph of FIG. 13. An average value of the GRAY scales at the 3 respective places is calculated. Such an average value is defined as the GRAY scale of cBN (hereinafter, also written as the "$G_{cbn}$".)

Three places are arbitrarily selected from the regions shown in gray where the binding phase is present in the backscattered electron image of FIG. 12. The binding phase, for example, is the parts shown in the ovals with a sign d in the backscattered electron image of FIG. 13.

Each GRAY scale at the 3 places of the binding phase is read out from the concentration profile graph. Each GRAY scale at the 3 places of the binding phase is defined as the average value of GRAY scales of each of the 3 places surrounded by the ovals with a sign d in the concentration profile graph of FIG. 13. An average value of the GRAY scales at the 3 respective places is calculated. Such an average value is defined as the GRAY scale of the binding phase (hereinafter, also written as the "$G_{binder}$".)

The GRAY scale represented by $(G_{cbn}+G_{binder})/2$ is determined as the GRAY scale at the interface between the black regions (cBN particles) and the binding phase. For example, the GRAY scale $G_{cbn}$ of the black regions (cBN particles) is represented by line $G_{cbn}$ in the concentration profile graph of FIG. 13. The GRAY scale $G_{binder}$ of the binding phase is represented by line $G_{binder}$. The GRAY scale represented by $(G_{cbn}+G_{binder})/2$ is shown by line G1.

As described above, when the interface between the black regions (cBN particles) and the binding phase is determined in the concentration profile graph, the value of X coordinate and Y coordinate at the interface between the black regions (cBN particles) and the binding phase is read out. In the backscattered electron image of FIG. 14, the interface between the black regions (cBN particles) and the binding phase is the part shown in the oval with a sign e. In the concentration profile graph of FIG. 14, the interface between the black regions (cBN particles) and the binding phase is the part shown by the arrow e. The value of X coordinate and Y coordinate at the arrow e corresponds to the value of X coordinate and Y coordinate at the interface between the black region (cBN particles) and the binding phase. The interface may be set arbitrarily. In the example of FIG. 14, the part that includes the interface is shown in the oval e.

Figure 15:
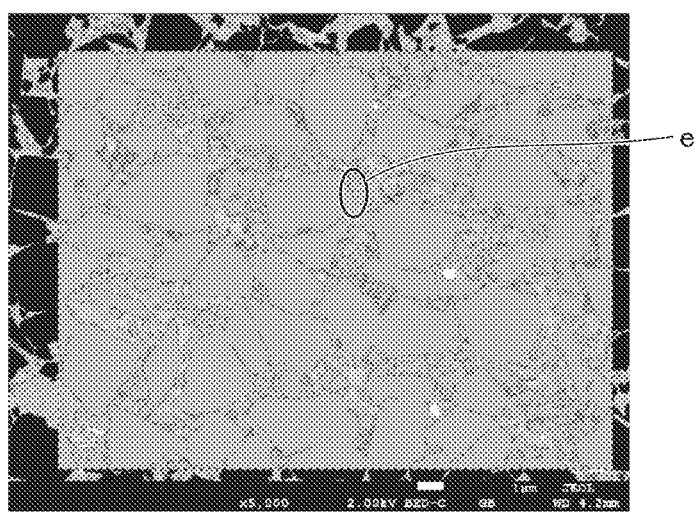
FIG. 15 is a binary image of the backscattered electron image of FIG. 10.

When the value of X coordinate and Y coordinate at the interface between the black region (cBN particles) and the binding phase is regarded as the threshold, the binarization is carried out. The binarized image is shown in FIG. 15. In FIG. 15, the area surrounded by a dotted line is the binarized region. In the binarized image, white regions are sometimes included in addition to the bright fields (gray regions) and the dark fields (black regions). The white regions are the regions shown in white in the pre-binarized image.

In FIG. 15, an area percentage of pixels derived from the dark fields (pixels derived from cBN particles) accounting for the area of the perimetry is calculated. The calculated area percentage is regarded as the volume percentage of cBN particles.

For example, in FIG. 15, a volume percentage of the binding phase may be calculated by calculating an area percentage of pixels derived from the bright fields (pixels derived from the binding phase) accounting for the area of the perimetry.

<Method for Producing the cBN Sintered Material>

The cBN sintered material of the present embodiment may be produced by, for example, the following production method.

Figure 9:
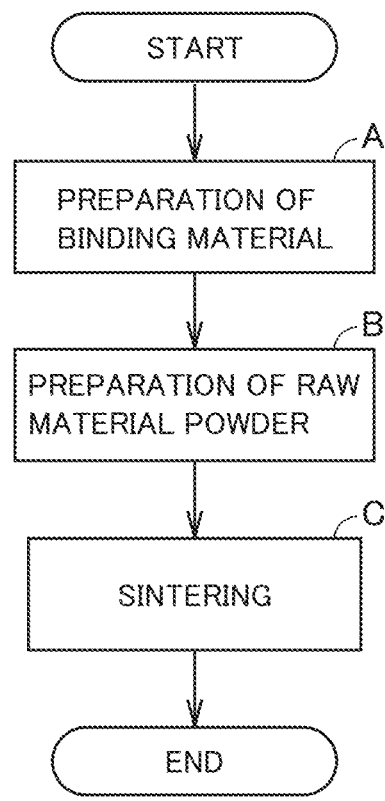
FIG. 9 is a flow chart showing a method for producing a cBN sintered material of the present embodiment.

FIG. 9 is a flow chart showing the method for producing the cBN sintered material of the present embodiment. The method for producing the cBN sintered material of the present embodiment comprises "(A) preparation of a binding material", "(B) preparation of a raw material powder", and "(C) sintering."

In the present embodiment, a binding material having a specific composition may be used as the interfacial phase is formed. The surface of cBN particles may be modified as the interfacial phase is formed. A binding material having a specific composition may be used and the surface of cBN particles may be modified.

<<(A) Preparation of a Binding Material>>

In the present embodiment, a binding material is prepared by mixing a first material and a second material. The binding material is a precursor of the binding phase. The mixing ratio of the first material and the second material may be suitably changed in accordance with the composition of an intended binding phase. The mixing ratio of the first material and the second material may be, for example, "first material:second material=1:3 to 3:1 (mass ratio)."

(The First Material)

The first material is the material that is going to be the main component of the binding phase. The first material is also termed as "main binding material." The first material may include one or more selected from the group consisting of, for example, TiC, TiN, and TiCN.

The first material is desirably difficult to cause the interdiffusion of elements between it and the second material to be described later. It is because the difficulty to cause the interdiffusion of elements facilitates the reaction of the second material with cBN particles, and thereby the formation of the interfacial phase is facilitated.

The first material may have a composition represented by, for example, "formula (I):TiMCN." In formula (I), M is one or more selected from the group consisting of Zr, Nb, Mo, Hf, Ta, and W.

For example, the first material may be prepared by forcing M (Nb and the like) to be dissolved in TiCN and the like. As a result of the solid solution of M, it is presumed that the crystal structure is distorted. For this reason, the interdiffusion of elements with the second material is presumably less likely to be caused during sintering.

The first material having the composition of the above formula (I) is prepared by, for example, the following procedure. For example, a $TiO_2$ powder, an oxide powder of M (Nb and the like), and a carbon powder are mixed to thereby prepare a mixed powder. The mixing ratio may be, for example, "$TiO_2$:oxide of M:carbon=65:17:18 (mass ratio)." For example, the mixed powder is heat-treated under a reducing atmosphere. The reducing atmosphere may be, for example, a nitrogen atmosphere. The heat treatment temperature may be, for example, 1800° C. or more and 2200° C. or less. The heat treatment time may be, for example, about 60 minutes. This heat treatment may generate a single-phase compound having the composition of the above formula (I). Further, the average particle size of the single-phase compound is adjusted by, for example, the wet milling method.

The general heat treatment temperature during synthesizing the first material (TiC, TiN, TiCN and the like) is 1500° C. or less. This temperature is a near sintering temperature (about 1200° C. to 1800° C.) The first material described above is heat-treated at, for example, a temperature of 1800° C. or more and 2200° C. or less. That is, the first material of the present embodiment may be heat-treated at a temperature more than the sintering temperature. The element diffusion from the first material, that has been heat-treated in advance at a sintering temperature or more, may be prevented during the actual sintering.

In the first material described above, an oxide is used as a raw material. The oxygen included in the raw materials, when dissolved in the constituent components of the binding phase, may contribute to the solid-solution strengthening of the binding phase.

(The Second Material)

The second material is the component for binding the first material and cBN particles. The second material is also termed as the "sub binding material." Conventionally, for example, intermetallic compounds such as Ti, Al, TiAl, and $TiAl_3$ are used as the second material. To the contrary, the second material of the present embodiment may include at least one selected from the group consisting of, for example, carbide such as $Ti_2AlC$, nitrides such as $Ti_2AlN$, and carbonitride such as $Ti_2AlCN$.

An oxide such as $B_2O_3$ is presumed to be present on the surface of cBN particles. Carbides such as $Ti_2AlC$, nitrides such as $Ti_2AlN$, and carbonitride such as $Ti_2AlCN$ are expected to facilitate the decomposition of the oxide ($B_2O_3$ and the like) during sintering. Further, the oxygen to be generated by the decomposition of the oxide may be reduced by the carbon included in a carbide and a carbonitride. The carbon monoxide (CO), the carbon dioxide ($CO_2$) and the like to be generated by the reduction reaction are the gases and hence may be easily discharged out of the system. Further, as carbon is diffused out over the surface of cBN particles in the process of the reduction reaction, the surface wettability of cBN particles is expected to be enhanced. Due to the enhanced wettability, Al is supposedly distributed thin and homogeneously on the surface of cBN particles. As a result, the adhesion of cBN particles and the binding phase is expected to be enhanced.

Further, carbon may block metal elements other than Al from diffusing in the interfacial phase. This is expected to enhance the adhesion of cBN particles and the binding phase.

$Ti_2AlC$ is produced by, for example, the following procedure. For example, a Ti powder, an Al powder, and a Ti" powder are mixed to thereby prepare a mixed powder. The mixing ratio may be, for example, "Ti:Al:TiC=37:22:41 (mass ratio)." For example, the mixed powder is heat-treated under a vacuum atmosphere. The heat treatment temperature may be, for example, about 1500° C. The heat treatment time may be, for example, about 30 minutes. This heat treatment may generate, for example, a single-phase compound of $Ti_2AlC$. Further, the average particle size of the single-phase compound is adjusted by, for example, the wet milling method.

<<(B) Preparation of a Raw Material Powder>>

In the present embodiment, a raw material powder is prepared by mixing cBN particles and the binding material. cBN particles and the binding material may be mixed by, for example, wet mixing. The medium for the wet mixing may be, for example, ethanol. After mixing, the raw material powder may be naturally dried.

After mixing, the mixed powder may be degassed. During degassing, for example, the raw material powder may be heated to a temperature of 900° C. or more under a vacuum atmosphere.

(Surface Modification of cBN Particles)

In the present embodiment, the surface of cBN particles may be modified prior to the preparation of the raw material powder. When the surface of cBN particles is modified, the formation of the interfacial phase is expected to be facilitated.

An oxide layer is formed on the surface of cBN particles. The oxide layer may be, for example, crystalline or amorphous. The oxide layer may have a composition such as, for example, $B_2O_3$. It is presumed that the oxide layer is formed by adsorption of water and oxygen to the surface of cBN particles when cBN particles are washed and exposed to the air. The thickness of the oxide layer has a dispersion. The dispersion in the thickness of the oxide layer presumably affects the diffusion of B and N during sintering. As a result, brittle substances are presumably generated.

For example, the surface of cBN particles may be modified so that the thickness of the oxide layer is uniform. Further, the surface of cBN particles may be modified so that the surface of cBN particles is modified with an organic material.

For example, in supercritical water, cBN particles and an organic material may come in contact with each other. The organic material may be, for example, hexylamine and paraffin. It is expected that in supercritical water, the thicker part of the oxide layer is selectively dissolved and the thickness of the oxide layer becomes uniform. Further, when the surface of cBN particles is modified with an organic material, carbon that has the reduction action is expected to be introduced to the surface of cBN particles. The surface of cBN particles may be modified by, for example, irradiating the surface of cBN particles with plasma among others.

<<(C) Sintering>>

In the present embodiment, the cBN sintered material is produced by sintering the raw material powder.

For example, the degassed raw material powder is filled in a capsule. When the raw material powder is left in the air after degassed, the water and oxygen in the air may adsorb to the raw material powder. For this reason, it is desirable that the raw material power be quickly filled in a capsule after degassed.

The capsule may be, for example, a Ta capsule. The capsule is hermetically sealed by a metal sealing material. For the sintering operation, for example, a belt-type ultrahigh-pressure and high-temperature generator is used. The hermetically sealed capsule is set in the belt-type ultrahigh-pressure and high-temperature generator. The raw material powder is sintered in the belt-type ultrahigh-pressure and high-temperature generator. The pressure during sintering may be, for example, 5.5 GPa or more and 8 GPa or less. The temperature during sintering may be, for example, 1200° C. or more and less than 1800° C. When a pressure during sintering is 6 GPa or more and 7 GPa or less and a temperature during sintering is 1400° C. or more and 1600° C. or less, for example, production costs and performances are in good balance.

When the surface of cBN particles is modified with an organic material by the surface modification of cBN particles, the organic material is decomposed by heat during sintering. It is presumed that the gas generated by the decomposition of the organic material infiltrate homogeneously throughout the gaps of the pressurized powder (raw material powder). A part of the decomposed organic material may possibly remain on the surface of cBN particles.

<Cutting Tool>

The cutting tool of the present embodiment comprises the cBN sintered material of the present embodiment. In the cutting tool, the cBN sintered material functions as a cutting blade. The cutting tool may consist essentially of the cBN sintered material. The cutting tool may further include constituents other than the cBN sintered material. For example, the cutting tool may include a base metal made of a cemented carbide. The cBN sintered material may be arranged at the cutting edge of the base metal.

The cutting tool of the present embodiment may be a coated cutting tool. The coated cutting tool includes a covering film. The covering film covers at least a part of the surface of the cBN sintered material. The covering film include, for example, a ceramics material.

The shape of the cBN tool should not be particularly limited. The cBN tool may be, for example, an insert (for a drill, an end mill, a milling process, a lathe turning process and the like), a metal slitting saw, a gear cutting tool, a reamer, a tap, or a tool bit.

EXAMPLE

Hereinafter, examples of the present disclosure (in the present description, also written as the "present example") will be described. However, the following descriptions do not intend to limit the scope of claims.
<Production of the cBN Sintered Material>
Sample 1 to sample 22 shown in the following Table 1 were produced. Sample 1 to sample 19 are Examples. Sample 20 to sample 22 are Comparative Examples.
<<Sample 1>>
TiCN was prepared as the first material. TiCN had an average particle size of 0.5 μm.

A Ti powder, an Al powder, and a TiC powder were mixed to prepare a mixed powder. The mixing ratio was "Ti:Al:TiC=37:22:41 (mass ratio)." The mixed powder was heat-treated. The heat treatment conditions are as follows.
Heat Treatment Conditions
　Atmosphere vacuum
　Temperature 1520° C.
　Time 30 minutes A single-phase compound was formed by the heat treatment. This single-phase compound presumably has the composition of $Ti_2AlC$. The single-phase compound was crushed by the ball mill method. The second material was thus prepared. The second material had an average particle size of 0.5 μm.

The first material and the second material were mixed to prepare a binding material. The mixing ratio was "first material:second material=1:3 (mass ratio)."

cBN particle was prepared. cBN particles had an average particle size of 3 μm. cBN particles and the binding material were mixed by a ball mill. A raw material powder was thus prepared. The mixing ratio was "cBN particles:binding material=70:30 (volume ratio)."

The raw material powder was filled in a capsule. The capsule was a Ta capsule. The capsule was hermetically sealed by a metal sealing material. The hermetically sealed capsule was set in a belt-type ultrahigh-pressure and high-temperature generator. The raw material powder was sintered in the belt-type ultrahigh-pressure and high-temperature generator. The sintering conditions are as follows. As described above, the cBN sintered material of sample 1 was produced.
Sintering Conditions

| Pressure | 6.5 GPa |
| Temperature | 1500° C. |
| Time | 15 minutes |

<<Sample 2>>
A supercritical water nano particle synthesis system (product name "MOMI-cho mini" produced by ITEC Co., Ltd. was prepared. Supercritical water was generated by this system. The generation conditions of supercritical water are as follows.
Generation Conditions of Supercritical Water

| Pressure | 34 MPa |
| Temperature | 381° C. |
| Flow rate | 2 ml/min |

Hexylamine was prepared as the organic material. cBN particle was prepared. cBN particles had an average particle size of 3 μm.

In this system, hexylamine and cBN particles were continuously fed to the supercritical water. A content of hexylamine in the mixture of the supercritical water, hexylamine, and cBN particles was 10 mass %. In the same mixture, a content of cBN particles was 10 mass %. This reduced the oxide layer ($B_2O_3$) on the surface of cBN particles. Further, the carbon derived from the organic material modified the surface of cBN particles. It is presumed that carbon forms a very thin homogeneous film on the surface of cBN particles.

Using GC-MS (gas chromatography-mass spectrometry), the organic matter (modifying material) that modified the surface of cBN particles was identified, and the modifying material was simultaneously quantified. A modification amount of carbon was calculated from the molecular formula of the modifying material and the modification amount of the modifying material. The modification amount of carbon was 529 ppm. As described above, the modified cBN particles were prepared.

The cBN sintered material of the sample 2 was produced by carrying out the same operation as sample 1 except that the modified cBN particles obtained above were used in place of cBN particles.
<<Sample 3>>
The cBN sintered material of sample 3 was produced by carrying out the same operation as sample 2 except that a content of hexylamine in the mixture consisting of supercritical water, hexylamine, and cBN particles was changed to 1 mass %. In sample 3, the modification amount of carbon was 48 ppm.
<<Sample 4>>
The cBN sintered material of sample 4 was produced by carrying out the same operation as sample 2 except that the mixing ratio of the modified cBN particles to the binding material was changed to "modified cBN particles:binding material=60:40 (volume ratio)."
<<Sample 5>>
The cBN sintered material of sample 5 was produced by carrying out the same operation as sample 2 except that the mixing ratio of the modified cBN particles to the binding material was changed to "modified cBN particles:binding material=45:55 (volume ratio)."
<<Sample 6>>
The cBN sintered material of sample 6 was produced by carrying out the same operation as sample 2 except that the mixing ratio of the modified cBN particles to the binding material was changed to "modified cBN particles:binding material=20:80 (volume ratio)."
<<Sample 7>>
The cBN sintered material of sample 7 was produced by carrying out the same operation as sample 2 except that the mixing ratio of the modified cBN particles to the binding material was changed to "modified cBN particles:binding material=80:20 (volume ratio)."

<<Sample 8>>

In the production of sample 8, TiNbCN was used as the first material. The first material was prepared by the following procedure. A TiO$_2$ powder, an Nb$_2$O$_3$ powder, and a carbon powder were mixed to prepare a mixed powder. The mixing ratio was "TiO$_2$:Nb$_2$O$_3$:carbon=57:17:26 (mass ratio)." This mixed powder was heat-treated. The heat treatment conditions are as follows.

Heat Treatment Conditions

| Atmosphere | nitrogen |
|---|---|
| Temperature | 2200° C. |
| Time | 60 minutes |

A single-phase compound was formed by the heat treatment. This single-phase compound was crushed by the ball mill method. The first material was thus prepared. The first material had an average particle size of 0.5 μm.

The cBN sintered material of sample 8 was produced by carrying out the same operation as sample 4 except that the first material (TiNbCN) obtained above was used.

<<Sample 9>>

The cBN sintered material of sample 9 was produced by carrying out the same operation as sample 8 except that the time in the sintering conditions was changed to 30 minutes.

<<Sample 10>>

The cBN sintered material of sample 10 was produced by carrying out the same operation as sample 8 except that Ti$_2$AlN was used as the second binding material. Ti$_2$AlN of the present sample was synthesized by the following procedure. A Ti powder, an Al powder, and a TiN powder were mixed to prepare a mixed powder. The mixing ratio was "Ti:Al:TiN=31:21:48 (mass ratio)." Ti$_2$AlN was synthesized by heat treating this mixed powder. The heat treatment conditions are as follows.

Heat Treatment Conditions

| Atmosphere | vacuum |
|---|---|
| Temperature | 1550° C. |
| Time | 30 minutes |

<<Sample 11>>

The cBN sintered material of sample 11 was produced by carrying out the same operation as sample 8 except that Ti$_2$AlN was used as the second binding material. Ti$_2$AlN of the present sample was synthesized by the following procedure. A Ti powder, an Al powder, and a TiN powder were mixed to prepare a mixed powder. The mixing ratio was "Ti:Al:TiN=31:22:47 (mass ratio)." Ti$_2$AlN was synthesized by heat treating this mixed powder. The heat treatment conditions are as follows.

Heat Treatment Conditions

| Atmosphere | vacuum |
|---|---|
| Temperature | 1550° C. |
| Time | 30 minutes |

<<Sample 12>>

The cBN sintered material of sample 12 was produced by carrying out the same operation as sample 10 except that TiNbN was used as the first binding material. TiNbN of the present sample was synthesized by the following procedure. A TiN powder (manufactured by JAPAN NEW METALS CO., LTD.) and an NbN powder (manufactured by JAPAN NEW METALS CO., LTD.) were mixed to prepare a mixed powder. The mixing ratio was "TiN:NbN=92:8 (mass ratio)." TiNbN was synthesized by heat treating this mixed powder. The heat treatment conditions are as follows. After heat treating, the TiNbN powder was crushed.

Heat Treatment Conditions

| Atmosphere | nitrogen |
|---|---|
| Temperature | 2200° C. |
| Time | 60 minutes |

<<Sample 13>>

The cBN sintered material of sample 13 was produced by carrying out the same operation as sample 10 except that Ti$_2$AlN synthesized in the following mixing ratio was used. The mixing ratio was "Ti:Al:TiN=30:25:45 (mass ratio)."

<<Sample 14>>

In the production of sample 14, ZrO$_2$ was used in place of Nb$_2$O$_3$. That is, the mixing ratio of the mixed powder was "TiO$_2$:ZrO$_2$:carbon=58:16:26 (mass ratio)."

The cBN sintered material of sample 14 was produced by carrying out the same operation as sample 8 except that the composition of the first material was changed.

<<Sample 15>>

In the production of sample 15, MoO$_3$ was used in place of Nb$_2$O$_3$. That is, the mixing ratio of the mixed powder was "TiO$_2$:MoO$_3$:carbon=56:18:26 (mass ratio)."

The cBN sintered material of sample 15 was produced by carrying out the same operation as sample 8 except that the composition of the first material was changed.

<<Sample 16>>

In the production of sample 16, Nb$_2$O$_3$ and ZrO$_2$ were used. That is, the mixing ratio of the mixed powder was "TiO$_2$:Nb$_2$O$_3$:ZrO$_2$:carbon=57:8.5:8.5:26 (mass ratio)." The cBN sintered material of sample 16 was produced by carrying out the same operation as sample 8 except that the composition of the first material was changed.

<<Sample 17>>

In the production of sample 17, HfO$_2$ was used in place of Nb$_2$O$_3$. That is, the mixing ratio of the mixed powder was "TiO$_2$:HfO$_2$:carbon=53:24:23 (mass ratio)." The cBN sintered material of sample 17 was produced by carrying out the same operation as sample 8 except that the composition of the first material was changed.

<<Sample 18>>

In the production of sample 18, Ta$_2$O$_5$ was used in place of Nb$_2$O$_3$. That is, the mixing ratio of the mixed powder was "TiO$_2$:Ta$_2$O$_5$:carbon=52:25:23 (mass ratio)." The cBN sintered material of sample 18 was produced by carrying out the same operation as sample 8 except that the composition of the first material was changed.

<<Sample 19>>

In the production of sample 19, WO$_3$ was used in place of Nb$_2$O$_3$. That is, the mixing ratio of the mixed powder was "TiO$_2$:WO$_3$:carbon=52:26:22 (mass ratio)." The cBN sintered material of sample 19 was produced by carrying out the same operation as sample 8 except that the composition of the first material was changed.

<<Sample 20>>

In the production of sample 20, the mixing ratio of the modified cBN particles to the binding material was "modified cBN particles:binding material=10:90 (volume ratio)." The cBN sintered material of sample 20 was produced by carrying out the same operation as sample 2 except that the mixing ratio of the modified cBN particles and the binding material was changed.

19

<<Sample 21>>

In the production of sample 21, the mixing ratio of the modified cBN particles to the binding material was "modified cBN particles:binding material=90:10 (volume ratio)." The cBN sintered material of sample 21 was produced by carrying out the same operation as sample 2 except that the mixing ratio of the modified cBN particles and the binding material was changed.

<<Sample 22>>

The cBN sintered material of sample 22 was produced by carrying out the same operation as sample 1 except that Ti$_2$AlN was used as the second material.

Evaluation

The compounds included in the binding phase were identified by XRD.

20

Intermittent cutting

Lathe
LB400 manufactured by Okuma Corporation

Cutting Target
Hardened steel SKD11 (high-strength hardened steel), hardness 60 HRC, a V-shaped groove is formed around the outer circumference.

In the cutting test, the life of the cBN tools was measured. The results are shown in Table 1 below. The measurement procedure was as follows. Every cutting of 0.1 km was performed, the size of chippings at the cutting edge was measured. The size of chippings was defined as the size of a chip in the direction of the cutting force. The direction of the cutting force uses the position of the cutting edge ridgeline before starting the cutting as the reference. The distance at which the size of a chipping at the cutting edge was 0.1 mm or more was defined as the life.

TABLE 1

Table 1 Sample list

| Sample No. | cBN particles Percentage [vol %] | Binding phase Composition | Interfacial phase | | | | Evaluation Life [km] |
|---|---|---|---|---|---|---|---|
| | | | Element | Total concentration (Al + N) [At %] | Concentration ratio (N/B) [—] | Concentration ratio (C/Al) [—] | Average value of thicknesses [nm] | |

| Sample No. | cBN particles Percentage [vol %] | Binding phase Composition | Element | Total concentration (Al + N) [At %] | Concentration ratio (N/B) [—] | Concentration ratio (C/Al) [—] | Average value of thicknesses [nm] | Evaluation Life [km] |
|---|---|---|---|---|---|---|---|---|
| 1 | 70 | TiCN, TiB$_2$, Al Compound* | Al, N, B, O | 50.0 | 3.90 | — | 4 | 0.95 |
| 2 | 70 | TiCN, TiB$_2$, Al Compound | Al, N, B, O, C | 75.2 | 1.21 | 0.20 | 10 | 1.20 |
| 3 | 70 | TiCN, TiB$_2$, Al Compound | Al, N, B, O, C | 65.0 | 2.20 | 0.01 | 4 | 1.15 |
| 4 | 60 | TiCN, TiB$_2$, Al Compound | Al, N, B, O, C | 63.0 | 1.90 | 0.30 | 4 | 1.32 |
| 5 | 45 | TiCN, TiB$_2$, Al Compound | Al, N, B, O, C | 62.0 | 2.00 | 0.18 | 9 | 1.22 |
| 6 | 20 | TiCN, TiB$_2$, Al Compound | Al, N, B, O, C | 58.0 | 3.10 | 0.03 | 10 | 0.51 |
| 7 | 80 | TiCN, TiB$_2$, Al Compound | Al, N, B, O, C | 55.0 | 2.50 | 0.03 | 11 | 0.65 |
| 8 | 60 | TiNbCN, TiB$_2$, Al Compound | Al, N, B, O, C | 63.0 | 2.10 | 0.32 | 7 | 1.54 |
| 9 | 60 | TiNbCN, TiB$_2$, Al Compound | Al, N, B, O, C | 62.3 | 2.40 | 0.35 | 20 | 1.51 |
| 10 | 60 | TiNbCN, TiB$_2$, Al Compound | Al, N, B, O, C | 62.0 | 2.43 | 0.02 | 50 | 1.48 |
| 11 | 60 | TiNbCN, TiB$_2$, Al Compound | Al, N, B, O, C | 61.8 | 2.44 | 0.03 | 100 | 1.46 |
| 12 | 60 | TiNbN, TiB$_2$, Al Compound | Al, N, B, O | 63.0 | 3.05 | 0 | 50 | 1.5 |
| 13 | 60 | TiNbCN, TiB$_2$, Al Compound | Al, N, B, O, C | 60.0 | 2.50 | 0.03 | 120 | 1.16 |
| 14 | 60 | TiZrCN, TiB$_2$, Al Compound | Al, N, B, O, C | 62.5 | 1.95 | 0.31 | 6 | 1.48 |
| 15 | 60 | TiMoCN, TiB$_2$, Al Compound | Al, N, B, O, C | 63.5 | 2.00 | 0.34 | 8 | 1.45 |
| 16 | 60 | TiNbZrCN, TiB$_2$, Al Compound | Al, N, B, O, C | 61.5 | 2.10 | 0.33 | 9 | 1.52 |
| 17 | 60 | TiHfCN, TiB$_2$, Al Compound | Al, N, B, O, C | 61.0 | 2.30 | 0.37 | 11 | 1.44 |
| 18 | 60 | TiTaCN, TiB$_2$, Al Compound | Al, N, B, O, C | 60.5 | 2.20 | 0.28 | 10 | 1.43 |
| 19 | 60 | TiWCN, TiB$_2$, Al Compound | Al, N, B, O, C | 59.0 | 1.70 | 0.26 | 9 | 1.38 |
| 20 | 10 | TiCN, TiB$_2$, Al Compound | Al, N, B, O, C | 60.0 | 3.20 | 0.20 | 30 | 0.10 |
| 21 | 90 | TiCN, TiB$_2$, Al Compound | Al, N, B, O, C | 60.0 | 3.10 | 0.20 | 35 | 0.15 |
| 22 | 70 | TiCN, TiB$_2$, Al Compound | Ti, Al, N, B, O | 25.0 | 0.40 | — | 50 | 0.21 |

*Al compound includes, for example, AlN and Al$_2$O$_3$

Further, the composition of the interfacial phase was analyzed by STEM-EDX. The results are shown in Table 1 below.

Each of the cBN sintered materials produced above was used to produce cBN tools, respectively. A cutting test of the cBN tools was carried out. The cutting test conditions are as follows.

Tool Model Number
DNGA150412 (Cutting edge preparation S01225)

Cutting Conditions

| Cutting speed | 200 m/min |
| Feed rate | 0.2 mm/rev |
| Notch | 0.15 mm |
| Coolant | DRY |

Results

Sample 1 to sample 19 included the interfacial phase. Sample 22 did not include the interfacial phase. Sample 1 to sample 19, compared with sample 22, had longer lives. This is presumed because that interfacial phase prevented cracks from occurring and spreading.

Sample 20 included the interfacial phase. However, sample 20 had a short life. This is presumed because that the volume percentage of cBN particles was less than 20 vol %.

Sample 21 included the interfacial phase. However, sample 21 had a short life. This is presumed because that the volume percentage of cBN particles was more than 80 vol %.

[Another Aspect]

A cubic boron nitride sintered material comprising:
cubic boron nitride particles, a binding phase, and an interfacial phase, wherein the cubic boron nitride particles account for 20 vol % or more and 80 vol % or less in the cubic boron nitride sintered material, the total of the binding phase and the interfacial phase accounts for the balance of the cubic boron nitride particles of the cubic boron nitride sintered material, the binding phase includes one or more components, the component included in the binding phase includes one or more selected from the group consisting of compounds and solid solutions, each of the compounds and the solid solutions includes a first element and a second element, the first element is one or more selected from the group consisting of nitrogen, carbon, boron, and oxygen, the second element is one or more selected from the group consisting of Group 4 elements, Group 5 elements, Group 6 elements, and aluminum in the periodic table, the interfacial phase intervenes between the cubic boron nitride particles and the binding phase, the interfacial phase includes aluminum, nitrogen, boron, and oxygen, a total of an average value of the atomic concentrations of aluminum included in the interfacial phase and an average value of the atomic concentrations of nitrogen included in the interfacial phase is 50.0 at % or more, and a ratio of an average value of the atomic concentrations of nitrogen included in the interfacial phase to an average value of the atomic concentrations of boron included in the interfacial phase is more than 1.00.

The present embodiments and the present examples are examples in all aspects and should be considered as not restrictive. The scope of the present invention is defined by the claims but not by the present embodiments or the present examples, and all alterations in the claims and in a sense and scope of equivalents are intended to be included.

REFERENCE SIGNS LIST

11 Cubic boron nitride (cBN) particles, 12 binding phase, 13 interfacial phase.

The invention claimed is:

1. A cubic boron nitride sintered material comprising cubic boron nitride particles, a binding phase, and an intervening phase, wherein the cubic boron nitride particles account for 20 vol % or more and 80 vol % or less in the cubic boron nitride sintered material, a total of the volume percentages of the binding phase and the intervening phase is, when the volume percentage of the cubic boron nitride sintered material is 100 vol %, a numerical value obtained by subtracting a volume percentage of the cubic boron nitride particles from the 100 vol %, the binding phase includes one or more components selected from the group consisting of compounds and solid solutions, each of the compounds and the solid solutions includes a first element and a second element, the first element is one or more selected from the group consisting of nitrogen, carbon, boron, and oxygen, the second element is one or more selected from the group consisting of Group 4 elements, Group 5 elements, Group 6 elements, and aluminum in the periodic table, the intervening phase intervenes between the cubic boron nitride particles and the binding phase, the intervening phase includes aluminum, nitrogen, boron, and oxygen, a total of an average value of the atomic concentrations of aluminum included in the intervening phase and an average value of the atomic concentrations of nitrogen included in the intervening phase is 50.0 at % or more, and a ratio of an average value of the atomic concentrations of nitrogen included in the intervening phase to an average value of the atomic concentrations of boron included in the intervening phase is more than 1.00.

2. The cubic boron nitride sintered material according to claim 1, wherein the intervening phase further includes carbon, and when a line analysis of an atomic concentration is performed in a thickness direction of the intervening phase, the atomic concentration of aluminum has a single maximum value, and a ratio of an average value of the atomic concentrations of carbon to an average value of the atomic concentrations of aluminum is 0.01 or more and 0.30 or less.

3. The cubic boron nitride sintered material according to claim 1, wherein the cubic boron nitride particles account for 35 vol % or more and less than 75 vol % in the cubic boron nitride sintered material.

4. The cubic boron nitride sintered material according to claim 1, wherein the binding phase includes titanium, and the binding phase further includes one or more selected from the group consisting of zirconium, niobium, molybdenum, hafnium, tantalum, and tungsten.

5. The cubic boron nitride sintered material according to claim 1, wherein an average value of thicknesses of the intervening phase is 5 nm or more and 100 nm or less.

6. The cubic boron nitride sintered material according to claim 1, wherein an average value of the thicknesses of the intervening phase is 5 nm or more and 20 nm or less.

7. The cubic boron nitride sintered material according to claim 1, wherein oxygen is dissolved in the components included in the binding phase.

8. A cutting tool comprising the cubic boron nitride sintered material according to claim 1.

9. The cutting tool according to claim 8, wherein the cutting tool is a coated cutting tool, and the coated cutting tool includes a covering film, wherein the covering film covers at least a part of the surface of the cubic boron nitride sintered material.

\* \* \* \* \*